US009420220B2

(12) United States Patent
Nieten et al.

(10) Patent No.: US 9,420,220 B2
(45) Date of Patent: Aug. 16, 2016

(54) METHOD AND DEVICE FOR THE TIME-SEQUENTIAL RECORDING OF THREE-DIMENSIONAL IMAGES

(75) Inventors: Christoph Nieten, Jena (DE); Enrico Geissler, Jena (DE); Marco Pretorius, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 722 days.

(21) Appl. No.: 13/539,888

(22) Filed: Jul. 2, 2012

(65) Prior Publication Data

US 2013/0010087 A1    Jan. 10, 2013

(30) Foreign Application Priority Data

Jul. 4, 2011   (DE) .......................... 10 2011 106 453

(51) Int. Cl.
| | |
|---|---|
| *H04N 5/77* | (2006.01) |
| *H04N 5/238* | (2006.01) |
| *H04N 5/345* | (2011.01) |
| *H04N 13/02* | (2006.01) |
| *H04N 9/82* | (2006.01) |
| *G02B 27/22* | (2006.01) |

(52) U.S. Cl.
CPC ............... *H04N 5/772* (2013.01); *H04N 5/238* (2013.01); *H04N 5/345* (2013.01); *H04N 9/8227* (2013.01); *H04N 13/021* (2013.01); *H04N 13/0296* (2013.01); *G02B 27/2264* (2013.01)

(58) Field of Classification Search
CPC ..... G03B 35/00; H04N 13/0217; H04N 13/00
USPC .......................................................... 348/49
See application file for complete search history.

(56) References Cited

U.S. PATENT DOCUMENTS

| 5,673,147 | A | * | 9/1997 | McKinley ..................... 359/462 |
| 5,828,487 | A |   | 10/1998 | Greening et al. |
| 2004/0201888 | A1 | * | 10/2004 | Hagita .......................... 359/462 |
| 2005/0077450 | A1 |   | 4/2005 | Baer |
| 2009/0316114 | A1 | * | 12/2009 | Richards ........................... 353/7 |
| 2010/0182681 | A1 |   | 7/2010 | Luecke et al. |
| 2011/0134222 | A1 |   | 6/2011 | Yahav |
| 2011/0221925 | A1 | * | 9/2011 | Tajiri ......................... 348/222.1 |
| 2012/0002099 | A1 |   | 1/2012 | Tajiri |

OTHER PUBLICATIONS

Kinematics from Lines in a Single Rolling Shutter Image—Omar Ait-Aider, Adrien Bartoli, Nicolas Andreff.

* cited by examiner

*Primary Examiner* — Dave Czekaj
*Assistant Examiner* — Kyle Lotfi
(74) *Attorney, Agent, or Firm* — Nixon Peabody LLP; Jeffrey L. Costellia

(57) ABSTRACT

A method and device are provided for time-sequential recording of three-dimensional images each of which has at least one first and one second partial image. The device has a sensor (13) with pixels (16) subdivided into two mutually different pixel groups. An imaging optical unit has a switchable changeover device (9) that images the partial images of the three-dimensional image time-sequentially onto the sensor (13). A control unit is connected to the sensor (13) and the changeover device (9) to control the reading of the sensor (13) and the switching states of the changeover device (9) so that the changeover device (9), during the imaging of the partial images onto the sensor (13) assumes at least one switching state in which excerpts of different partial images are fed to the different pixel groups of the sensor (13).

15 Claims, 8 Drawing Sheets

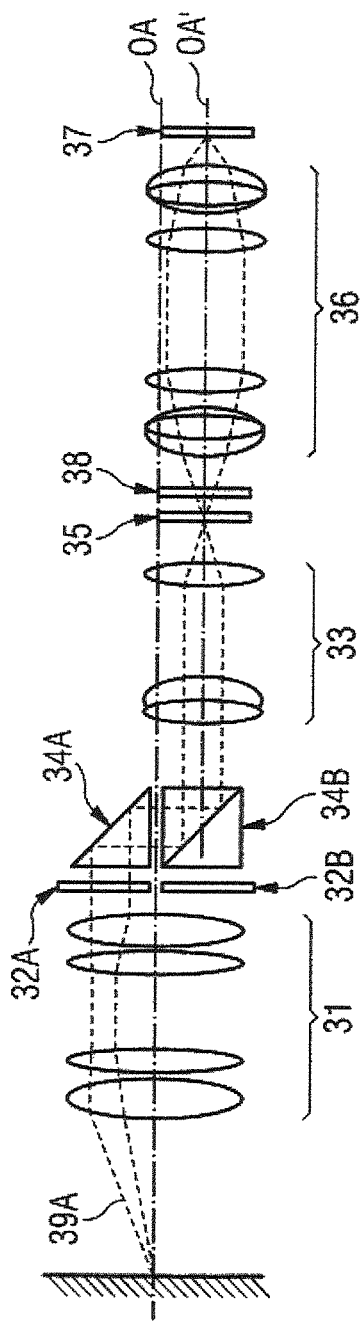
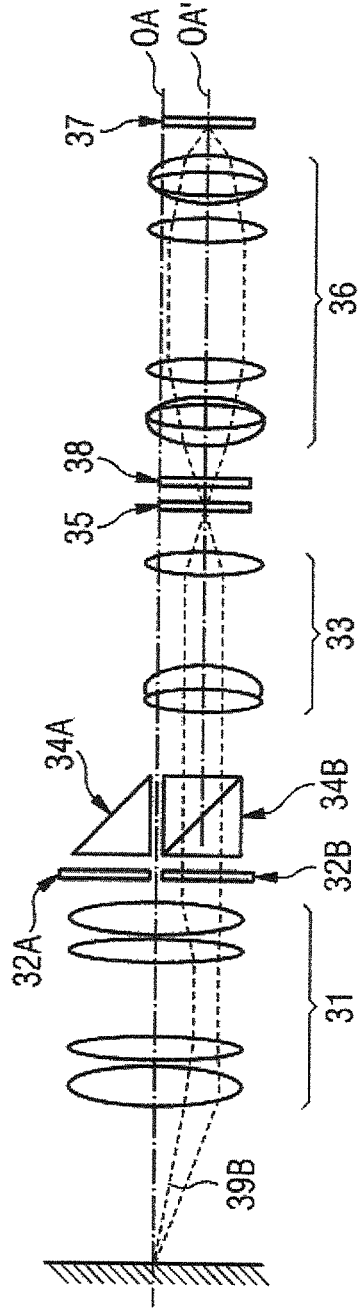

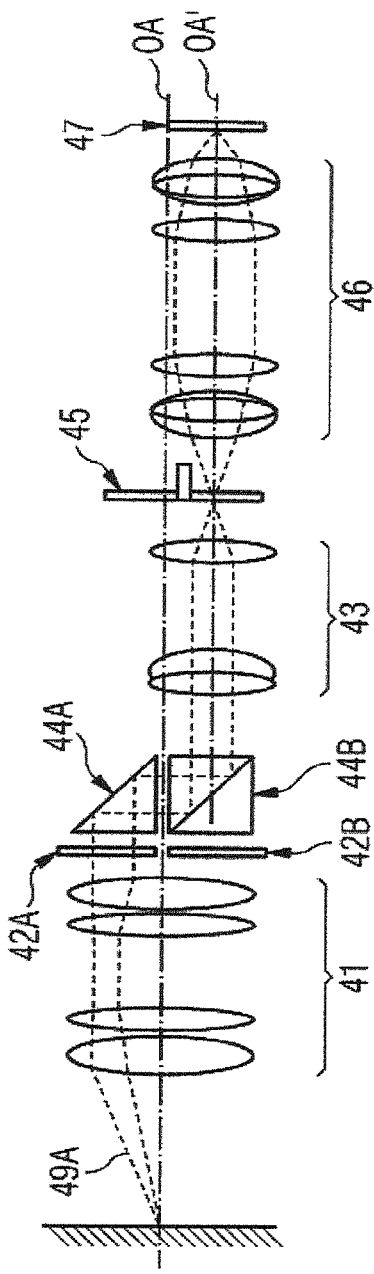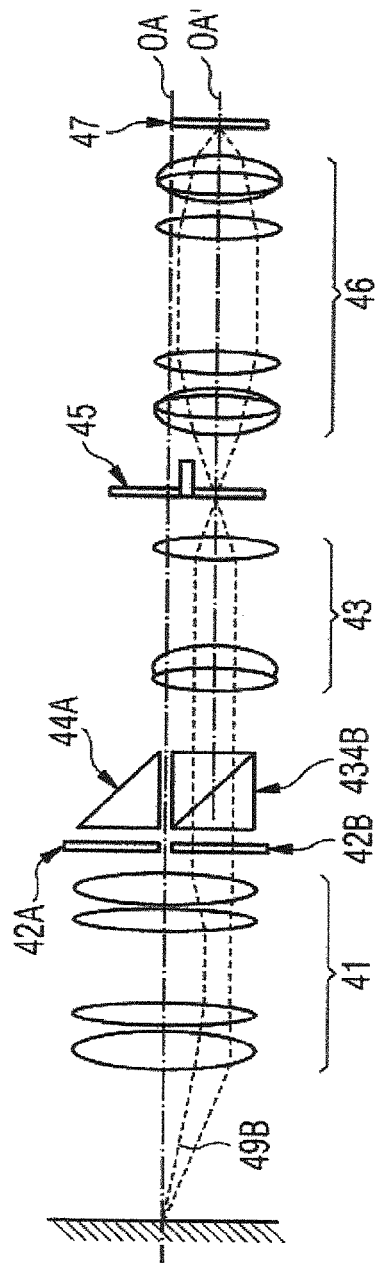

METHOD AND DEVICE FOR THE TIME-SEQUENTIAL RECORDING OF THREE-DIMENSIONAL IMAGES

BACKGROUND OF THE INVENTION

1. Field of the Invention

The present invention relates to a method for the time-sequential recording of three-dimensional images each comprising at least one first and one second partial image, with a single sensor having a number of pixels. In addition, the invention relates to a device for the time-sequential recording of three-dimensional images each comprising a first and a second partial image.

2. Description of the Related Art

With the 3D trend of cinemas in the broadcast sector but also for private use, not only image or film reproduction by means of 3D screens but also the solutions for stereoscopic image recording are required. Here the need is for compact and cost-effective solutions. One example of the use of 3D images or 3D films is the control of vehicles in which the driver has only a very restricted view toward the outside. Here there is a need for cost-effective and compact stereo data recording which is displayed to the driver in the interior of the vehicle and on the basis of which it performs control of the vehicle. This is the case for example for military vehicles such as tanks, for instance. Owing to the high costs of the cameras required for instance for the infrared range, it is expedient here to support the recording of stereo images by means of a single camera.

Another example of the use of 3D images or 3D films is the recording of magnified stereo images, during an operation by means of a stereo surgical microscope. In this case, a compact recording unit is required in order not to obstruct the surgeon. The requirement of compactness can be fulfilled by the arrangement of a single camera for both stereo channels.

What is common to the examples mentioned is that as efficient use as possible of the available light is desired. In the area of military applications, in particular this is desirable because the vehicles discussed often travel without illumination, and so as efficient use as possible of the light afforded entails a great advantage. In the area of surgical microscopes, too, as efficient use as possible of the light is advantageous in order not to burden the patients unnecessarily with light and in order to avoid damage to tissue, particularly in the case of interventions on the retina. Therefore, it is endeavored to obtain the highest possible luminous efficiency during the recording of a partial image in order, for example, to keep the exposure of the tissue as short as possible or to be able to use as much available light as possible in the shortest possible exposure times for recording the stereoscopic images.

The prior art discloses optical observation devices in which the stereoscopic partial beam paths are imaged onto a common image receiver by a common main lens. By way of example, U.S. Pat. No. 5,828,487 describes a stereoscopic observation system comprising a single observation beam path and a camera. A switchable diaphragm is arranged between the observation beam path and the camera and can be moved to and fro at high speed from a left position to a right position in the observation beam path. The stereoscopic partial images are thereby produced. The device can be operated with a video camera, wherein the diaphragm is synchronized with the image refresh frequency.

What is common to the devices from the prior art is that a diaphragm ensures that either light for a right or a left partial image of a stereo image reaches the sensor of the camera. Therefore, either a right or a left partial image is recorded at an arbitrary point in time. In order to be able to achieve a high image frequency during the recording of stereoscopic images with systems of this type, the image content of the sensor has to be shifted very rapidly into a buffer memory in order that the sensor is rapidly ready again for a new exposure. The memory content is then read from the buffer memory during the exposure for the next partial image and transferred to a computer. The buffer memory required firstly increases the costs of the camera, the camera becoming all the more expensive, the greater the speed at which it is intended to be possible to read the stereo images. Furthermore, the buffer memory has to be situated near the camera chip in order to enable lossless data transfer at high data rates, which has the effect that limits are imposed on reducing the camera volume.

Therefore, the available camera technology also imposes limits on the endeavor to utilize the light as optimally as possible during recordings of the stereoscopic images. This holds true particularly if, besides the price of the camera used, a compact structural size of the camera is also of importance.

In light of the prior art mentioned, it is an object of the present invention to provide an advantageous method for the time-sequential recording of 3-dimensional images with a single sensor.

It is a further object of the present invention to provide an advantageous device for the time-sequential recording of three-dimensional images.

SUMMARY OF THE INVENTION

In the method according to the invention, three-dimensional images each comprising at least one first and one second partial image are recorded time-sequentially by a single sensor. The sensor has a number of pixels, which are read time-sequentially and at least temporarily are subdivided into at least two mutually different pixel groups. In this case, the term "time-sequential reading" is intended to encompass not only the successive reading of individual pixels, but also time-sequential reading wherein sensor lines or columns are read successively. The mutually different pixel groups comprise a pixel group having pixels that have already been read and a pixel group having pixels that are predominantly still to be read, wherein the latter group can also consist exclusively of pixels that are still to be read. In the method, the partial images of the three-dimensional image are imaged onto the sensor time-sequentially with the aid of successively assumed different switching states of a switchable changeover device. During the time-sequential imaging of the partial images onto the sensor, the changeover device assumes at least one switching state in which excerpts of different partial images are fed to the mutually different pixel groups of the sensor.

By comparison with the prior art described in the introduction, the method according to the invention affords the advantage that, when it is carried out, it is possible to use a camera having a rolling shutter. In the case of such a rolling shutter, the camera image is read directly line by line or column by column. After the reading of a camera line or column, the latter is ready again for an exposure. Therefore, unlike in the case of a conventional shutter (global shutter), it is not necessary for the entire sensor just to be read before a new exposure can be effected. Since, in the case of the rolling shutter, until the next exposure it is not necessary to wait until the entire sensor has been read, rather the exposure is merely interrupted for the duration of the reading of a line or column, the reading speed of the sensor need not be increased with the aid of a buffer memory in order to increase the available exposure duration. Therefore, with comparable exposure durations, on account of the omission of the buffer memory, cameras having a rolling shutter are significantly more cost-effective than cameras having a global shutter and can also be realized more compactly. In the case of a rolling shutter, therefore, with the buffer memory being dispensed with, the camera image is read directly line by line or column by column, after which the pixel line or column read is rapidly ready again for an exposure. This has the consequence that the data recording also does not take place all in one go, rather the exposure times of the individual lines or columns are temporally shifted slightly relative to one another.

The method according to the invention makes it possible, in the case of a camera having a rolling shutter, to feed an excerpt of the previous partial image of the three-dimensional image to that pixel group having the pixels that have predominantly not yet been read. At the same time, an excerpt of the subsequent partial image can already be fed to the pixel group having the pixels that have already been read. If, in the case of a camera having a rolling shutter, the i-th line of the sensor is read, then light for the previous partial image, for example for the right stereo channel, can still be fed, for example, to all lines >i, whereas the next partial image, for example that for the left stereo channel, can already be fed to all sensor lines <i that have already been read. This becomes possible by virtue of the fact that the changeover element has different switching states, wherein at least one of the switching states is able to feed excerpts of different partial images to the mutually different pixel groups of the sensor.

In the devices according to the prior art, the changeover element used therein, for example a diaphragm, such as is described in U.S. Pat. No. 5,828,487 is not able to feed different partial images to different regions of the sensor. Therefore, the partial image fed to the sensor cannot be changed synchronously with a rolling shutter, but rather only when the last line of the sensor has been read. Therefore, the advantages that can be obtained when reading the sensor with a rolling shutter cannot be used for the recording of three-dimensional images in the devices according to the prior art.

The changeover device can have, in the method according to the invention, a structuring with a separating line between the structures, wherein the position of the image of the separating line on the sensor is determined by the switching state of the changeover device. The subdivision of the pixels of the sensor into the pixel groups is then determined by the position of the image of the separating line on the sensor. In this case, it is possible, in particular, to move the image of the separating line over the sensor by means of successively assumed switching states of the changeover device. This makes it possible to synchronize the changeover device with the sensor in a manner such that the separating line always separates a pixel group having pixels that have already been read from a pixel group having pixels that are predominantly still to be read.

The assignment of the separating line to the pixels that have already been read can be effected on the basis of a previously performed calibration, for example, in which a respective switching state of the changeover device is assigned to each state of the sensor in which a proportion of the pixels has been read. If the frequency of the reading of the sensor is then known, only the suitable frequency during the changeover of the switching states in the changeover device need be set in order to obtain the synchronization. In this case, the reading of the pixels can be synchronized with the movement of the separating line over the sensor in such a way that the separating line is shifted after a predetermined proportion of the pixels in the pixel group having the pixels that are predominantly still to be read has been read. By way of example, a pixel line or pixel column that has just been read can be removed, by shifting the separating line by said line or column, from the pixel group having the pixels that are predominantly still to be read and can be assigned to the pixel group having the pixels that have already been read. In the example with the pixel lines, however there is also the possibility of firstly reading a specific number of pixel lines before the separating line is shifted such that the pixel lines read are jointly removed from the pixel group having the pixels that are predominantly still to be read and are assigned to the pixel group having the pixels that have already been read. This is advantageous particularly when the structuring of the changeover element is coarser than the structuring of the sensor. By way of example, the changeover device can likewise be constructed in pixel-like fashion, wherein the pixels are then typically larger than the pixels of the sensor, such that the image of a pixel of the changeover device is typically imaged onto a plurality of pixels of the sensor. If the separating line were shifted line by line in this case, double exposures of pixels would be the consequence, which impairs the channel separation of the partial images. If a plurality of pixel lines are assigned to a line of the changeover element, it is additionally advantageous if the integration of the next image in the pixels of said lines is delayed until after the changeover of the switching state of the changeover element, such that double exposures can be reliably avoided.

A device for the time-sequential recording of three-dimensional images each comprising at least one first and one second partial image comprises a sensor having a number of pixels, an imaging optical unit having a switchable changeover device, and a control unit, connected to the sensor and the changeover device. In the sensor, the pixels are at least temporarily subdivided into two mutually different pixel groups, wherein the mutually different pixel groups comprise at least one pixel group having pixels that have already been read and a pixel group having pixels that are predominantly still to be read. In particular, the pixel group having the pixels that are predominantly still to be read can also consist exclusively of pixels that are still to be read, such that one pixel group comprises only pixels that have been read and the other pixel group comprises only pixels that are to be read. By means of the switchable changeover device of the imaging optical unit, the partial images of the three-dimensional image are imaged onto the sensor time-sequentially with the aid of successively assumed different switching states of the changeover device. The control unit controls the reading of the sensor and the switching states of the changeover device in such a way that the changeover device, during the imaging of the partial images onto the sensor assumes at least one switching state in which excerpts of different partial images are fed to the different pixel groups of the sensor. In particular, the control unit can be configured in such a way that, in the state of the changeover element in which excerpts of different partial images are fed to different pixel groups of the sensor an excerpt of the previous partial image is fed to the pixel group having pixels that have predominantly not yet been read, and an excerpt of the subsequent partial image is fed to the pixel group having the pixels that have already been read.

The device according to the invention is designed to perform that method according to the invention, such that the advantages described with regard to the method according to the invention are also present in the case of the device according to the invention. The device according to the invention enables the simultaneous imaging of excerpts of different partial images onto the sensor and the spatial separation thereof on the sensor. In other words, the device according to the invention enables both the simultaneity and the spatial separation of excerpts from the stereo channels on the sensor, and also a temporal assignment of the sensor pixels to said excerpts.

For realizing the device according to the invention, in particular a changeover device is suitable which has a structuring having a separating line between the structures, wherein the separating line separates structures from one another which feed excerpts of different partial images to the sensor, and wherein the switching state of the changeover device determines the position of the image of the separating line on the sensor. In this case, the subdivision of the pixels of the sensor into the pixel groups is determined by the position of the image of the separating line on the sensor. In this case, in particular, switching states of the changeover device can be present for a plurality of positions of the image of the separating line on the sensor. The switching states can then be set successively by the control unit in such a way that the image of the separating line on the sensor is moved over the sensor with the aid of the setting of the switching states. In this case, it is possible, for example, for the control unit to instigate the reading of a predetermined proportion of the pixels in the pixel group having the pixels that are predominantly still to be read before the next switching state of the changeover element is assumed.

Since, in this configuration, the separating line is present not only on the changeover element but also as an image on the sensor, the separating line is suitable for synchronizing the changeover element with the sensor. In this case, the image of the separating line on the sensor represents the separating line between the pixel groups. It can be tracked to the reading state of the sensor by means of the switching states. If, by way of example, the sensor is read line by line, the image of the separating line can be shifted by means of a change of the switching state of the changeover element by that number of pixel lines which have been read since the last change of the switching state. In this case, the switching state can be changed either after each reading of a line or after the reading of a predefined number of lines. The synchronization can be effected by means of a calibration such as has been described with reference to the method according to the invention. Alternatively, the position of the image of the separating line on the sensor can also be determined by means of image recognition software. Accordingly, a predetermined number of pixel lines can be read before a signal is transmitted to the changeover device, said signal indicating that the next switching state can be assumed. In this case, the number of pixel lines read corresponds to that number of pixel lines by which the image of the separating line on the sensor is shifted when the switching state is changed.

In one configuration, the changeover device comprises changeover elements, which are arranged in the form of a changeover element matrix having changeover element lines and/or changeover element columns and each of which can assume a number of different switching settings that is at least equal to the number of partial images that the three-dimensional image comprises. A structuring of the changeover device into at least two mutually different changeover element groups with mutually different switching settings of the changeover elements is then present, wherein each changeover element group is formed from a variable number of changeover element lines and/or changeover element columns. The assignment of the changeover element lines and/or changeover element columns to the changeover element groups is effected by the separating line and the position of the separating line on the changeover device is determined by the switching state of the changeover device. The pixels of the sensor are likewise arranged in the form of a pixel matrix having pixel lines and/or columns and each pixel group is formed from a variable number of pixel lines and/or pixel columns. The assignment of the pixel lines and/or pixel columns to the pixel groups is determined by the image of the separating line on the sensor. Each pixel group of the sensor is assigned to exactly one changeover element group of the changeover element. In this case, the changeover elements can be, for example, mirror elements of a tilting mirror device (digital micromirror device, DMD).

In the device according to the invention, the imaging optical unit can comprise, alongside the changeover device, in addition a first optical assembly, a second optical assembly, a third optical assembly and a partial beam generator.

The first optical assembly converts a divergent light beam coming from the object plane substantially into a parallel light beam. In other words, the first optical assembly images an object point to infinity (collimates the light emerging from the object point).

The partial beam generator is disposed downstream of the first optical assembly on the observer side and generates from the parallel light beam at least two parallel partial light beams representing the partial images of the three-dimensional image. It can be realized, for example, as a pinhole diaphragm having a number of diaphragm openings corresponding to the number of partial images, as a filter having filter regions having different filter characteristics, or as a polarization device having polarizers having mutually perpendicular polarization directions.

The second optical assembly is disposed downstream of the partial beam generator on the observer side and images the parallel partial light beams onto an intermediate image plane coinciding with the changeover device or situated in the vicinity thereof, such that intermediate images of the partial images of the three-dimensional image arise simultaneously there.

The third optical assembly is disposed downstream of the changeover device on the observer side and images the intermediate images onto the sensor. In this case, the control unit controls the switching states of the changeover device in such a way that the intermediate partial images are imaged onto the sensor time-sequentially by the third object assembly.

Such a configuration of the imaging optical unit makes it possible to realize the device according to the invention without dedicated optical elements needing to be present in each case for the partial beam paths. In particular, the third optical assembly can be configured in this case such that both partial beam paths in each case completely pass through the optical elements of said assembly, such that said assembly can be kept compact. One example of such an imaging optical unit is described in the German patent application bearing the no. DE 10 2011 010 262 to which reference is made with regard to further details as regards a possible construction of the imaging optical unit.

Further features, properties and advantages of the invention will become apparent from the following description of exemplary embodiments with reference to the accompanying figures.

BRIEF DESCRIPTION OF THE DRAWINGS

FIG. 9 shows a second concrete embodiment variant for the optical components of the device from FIG. 1, wherein the first partial beam path of a stereoscopic image is depicted.

FIG. 10 shows the device from FIG. 9, wherein the second partial beam path of the stereoscopic image is depicted.

FIG. 11 shows a third concrete embodiment variant for the optical components of the device from FIG. 1, wherein the first partial beam path of a stereoscopic image is depicted.

FIG. 12 shows the device from FIG. 11, wherein the second partial beam path of the stereoscopic image is depicted.

DETAILED DESCRIPTION OF THE PREFERRED EMBODIMENTS

Figure 1:
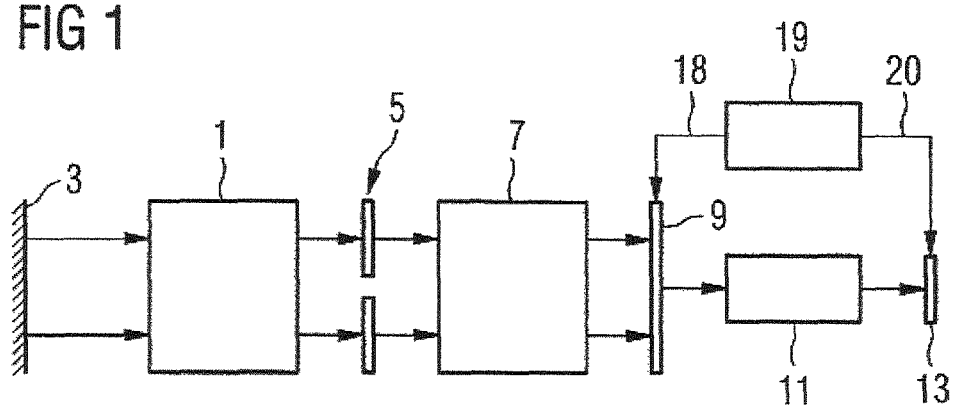
FIG. 1 shows in a schematic illustration the components of a device according to the invention for the time-sequential recording of three-dimensional images.

The basic construction of a device according to the invention for the time-sequential recording of three-dimensional images is explained below with reference to FIG. 1. The device can be realized in particular in the form of various optical observation devices, for example in the form of medical-optical observation devices such as, for instance, surgical microscopes or endoscopes, in the form of stereoscopic image recording devices for recording 3D films, in the form of optical observation devices for stereo data recording for vehicles, etc. The device comprises a first optical assembly 1, which forms the light from an object plane 3 substantially to infinity, that is to say collimates a divergent beam of rays emerging from the object plane 3 to form a parallel beam of rays. A partial beam generator 5 is arranged on the observer side with respect to the first optical assembly 1, and generates, from the beam of rays that is parallel after passing through the first optical assembly 1, a number of parallel partial beams of rays that is equal to the number of partial images of the three-dimensional image. In general, three-dimensional images are realized as stereoscopic images having two partial images, such that the partial beam generator typically generates two partial beams. However, it is also possible to use more than two partial images for constructing a three-dimensional image, particularly if a variation of the stereo base of the observer is intended to be possible. In this case, the partial beam generator can generate more than two partial beams. For the sake of clarity only stereoscopic beams of rays having in each case only two partial beams are illustrated in the figures. A change in the stereo base occurs, for example, if a plurality of observers are present during an operation and look through the same optical unit. By way of example an eye operation is often performed by two surgeons. In this case, one surgeon assumes, in relation to the operation site, a working position rotated by 90° relative to the other surgeon. That means that the stereo base of the two surgeons, which is defined by the respective connecting line of right and left eyes is also rotated by 90°.

Different devices can be employed as partial beam generator 5. By ways of example, the partial beam generator can be embodied as a pinhole diaphragm having a pinhole diaphragm openings corresponding to the number of partial beams to be generated. An alternative configuration can comprise a number of spectral filters, wherein the spectral filters have different transmission characteristics. In this case, the number of spectral filters having different transmission characteristics used is equal to the number of partial images of the three-dimensional image. A third configuration of the partial beam generator, which is suitable, in particular, for stereoscopic images, that is to say three-dimensional images having two partial images, is a partial beam generator 5 based on two polarizers having mutually orthogonal polarization states. In principle, however, any mechanism which is able to generate partial pupils from a pupil is appropriate as partial beam generator 5. In this case, the term pupil denotes a real or virtual image of the aperture stop. Therefore, there is also the possibility of configuring the partial beam generator in the form of virtual stops. The configuration as virtual stops can occur e.g. by means of the downstream optical elements.

A second optical assembly 7 is arranged on the observer side with respect to the partial beam generator 5, and images the partial beams into an intermediate image plane. The changeover device 9 is arranged in or in the vicinity of the intermediate image plane. The changeover device used can be a reflective changeover device, for example a tilting mirror matrix (DMD), or a transmissive changeover device such as, for instance, a liquid crystal display (LCD) together with a polarization analyzer or a spectral filter. In particular, it is possible to use the mirror matrix if the partial beam generator is configured as a diaphragm having at least two diaphragm openings, the liquid crystal display in conjunction with the polarization analyzer if the partial beam generator comprises two polarizers having mutually perpendicular polarization directions, and the spectral filter if the partial beam generator comprises at least two spectral filters having different transmission characteristics.

A third optical assembly 11 is disposed downstream of the changeover device 9 on the observer side. The partial beams of rays representing the partial images of the three-dimensional images are fed time-sequentially to said third optical assembly by the changeover device 9. For this purpose, the changeover device 9 has switching states enabling the different partial beams of rays to be fed time-sequentially to the third optical assembly 11. In this case, at least one switching state of the changeover element 9 is embodied such that excerpts from two different partial beams of rays which correspond to mutually non-overlapping excerpts of the intermediate partial images formed in the intermediate image plane are fed simultaneously to the third optical assembly. In this case, the third optical assembly can be embodied such that it is at least smaller than the first optical assembly, since its lateral dimensions need merely be designed for passage of a partial beam of rays.

A sensor 13 for image recording in a conjugate plane with respect to the intermediate image plane is arranged on the observer side with respect to the third optical assembly 11. The partial beams of rays are imaged onto the sensor 13 by means of the third optical assembly 11. If excerpts of two partial beams of rays which correspond to mutually non-overlapping excerpts of the intermediate partial images are fed simultaneously to the third optical assembly by the changeover device 9, the excerpts of the different partial images are imaged alongside one another on the sensor. The sensor can be, in particular, a CMOS sensor (CMOS: Complementary Metal Oxide Semiconductor).

The sensor 13 has a number of pixels, which are typically arranged in matrix form in lines and columns. In the context of the invention, a MOS sensor having a rolling shutter is used, in which the pixels of the sensor read line by line. Alternatively, however, reading column by column instead of line by line is also possible, in principle. After a line has been read, it is ready again for an exposure. This has the consequence that the exposure times of the individual lines are temporally shifted slightly relative to one another. If, in the case of a sensor having a rolling shutter, by way of example, the i-th line is read, then light for the image is still collected in all lines j>i. by contrast, all sensor lines that have already been read, that is to say j<i can already be used for collecting the light for the next image. In contrast thereto, in cameras having a global shutter, firstly all lines are read before a new exposure takes place. In order to enable rapid reading of the entire sensor, therefore, a buffer memory is required, which enlarges the required structural space and is all the more expensive, the greater the speed at which the sensor is intended to be read. The use of a sensor having a rolling shutter therefore affords the advantage that less structural space is required, and that the entire device is more cost-effective to produce.

Figure 2:
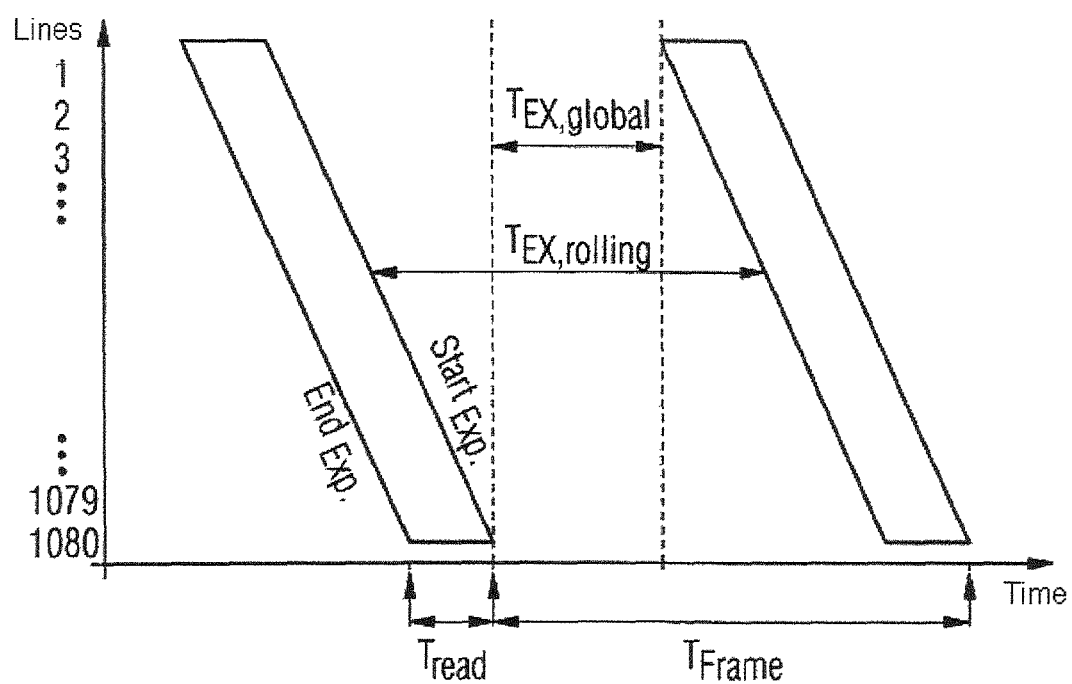
FIG. 2 shows a schematic diagram illustrating the time relationships during the reading of the sensor in a first embodiment variant of the method according to the invention.

FIG. 2 shows, on the basis of the example of a CMOS sensor having 1080 lines, the reading of the sensor lines with a rolling shutter as a function of time. Moreover, the reading duration Tread for a sensor line and the duration of the recording of an individual image (frame) Tframe are depicted. The exposure of a line takes place until the corresponding sensor line is read. The line marking the end of the exposure of the individual lines is designated as Endexp in FIG. 2. After the reading of a line, that is to say after the time duration Tread, said line is available again for exposure. The line marking the beginning of the exposure of the individual sensor lines is designated as Startexp in FIG. 2. The exposure duration Tex, rolling possible with a rolling shutter is given by the temporal distance between the line Startexp and the subsequent line Endexp.

If, in devices according to the prior art, only the complete partial images of the three-dimensional image can be fed successively to the sensor, the collecting of light for the subsequent partial image can begin only when the last sensor line (line no. 1080) has been read, since only then has the entire preceding partial image been converted into electrical signals. On the other hand, the collecting of light has to be ended before the first sensor line is read the next time, because otherwise a partial image change would take place during the exposure. Double exposures would be the consequence. For the exposure of the sensor, therefore, in the prior art, only a time window Tex,global is available as illustrated in FIG. 2. This time window corresponds to the time window that would be available if the sensor were operated with a global shutter without a fast buffer memory instead of with a rolling shutter.

Whereas in the case of a sensor having a global shutter an exposure of the sensor lines does not take place until the entire sensor has been read, in the case of a rolling shutter a renewed exposure of a line takes place after the latter has been read. In order to avoid double exposure, in the case of a rolling shutter, therefore, in the prior art, the exposure has to be restricted to the time window Tex,global in order to simulate a global shutter. In order to restrict the exposure in the case of a rolling shutter to the time window Tex,global shown in FIG. 2, flash illumination is therefore necessary. This illumination has to take place in the time period Tex,global, that is to say after the last line of the sensor (line 1080 in FIG. 2) has just been read and before the first line of the sensor (line 1 in FIG. 2) is read anew. The illumination means, typically arc lamps, used as standard in optical observation devices are not suitable for such flash illumination, however. Semiconductor light sources suitable, in principle, for flash illumination are expensive and are not powerful enough for some applications, for example shooting 3D films. In the field of medical-optical observation devices, moreover, the problem occurs that the operation site observed is never totally dark, and so light falls onto the sensor outside the time window Tex,global as well. This has the effect that an exposure takes place during the changeover from one partial image to the next partial image. This leads to incorrect information in the image, which is very disturbing precisely in the medical field. Although the optical observation device can be equipped with a fast diaphragm which allows light to pass to the sensor only during the desired exposure time Tex,global this solution is also relatively costly and requires additional structural space.

Although high-quality cameras having a rolling shutter also exist, in which cameras a global shutter can be simulated internally, this solution is expensive and disadvantageous with regard to the luminous efficiency, since the possible exposure duration Tex,rolling is not utilized.

What is common to all these solutions is that only a fraction of the exposure time that is possible in principle is available for the exposure of the sensor lines. Therefore, the invention proposes a method as to how the exposure duration can be lengthened beyond the exposure duration Tex,global.

In the method according to the invention, the pixels of the sensor at least temporarily are subdivided into two mutually different pixel groups, namely into a group consisting of pixels that have already been read, and a pixel group comprising pixels that are at least predominantly still to be read, as described below with reference to FIG. 3. The figure shows, by way of example, a changeover device 9 and a sensor 13, which each have three lines each having three changeover elements 14 and three pixels 16, respectively. The lines of the changeover device 9 and of the sensor 13 are numbered consecutively by 1 to 3. In this case, the changeover device 9 has at least one switching state in which different partial images are fed to the different pixel groups of the sensor 13. Each changeover element 14 can assume a number of different switching settings which is at least equal to the number of partial images which the three-dimensional image comprises. In the case of a stereoscopic image having one right and one left partial image, the changeover elements 14 can assume two switching settings. In one switching setting, an image point of a first partial image, for example of the right partial image, is imaged onto the sensor 13 by the changeover element 14 in interaction with the third optical assembly. In the other switching setting, by contrast, an image point of another partial image, for example of the left partial image, is imaged onto an assigned excerpt of the sensor 13 by the changeover element 14 in interaction with the third optical assembly.

Figure 3:
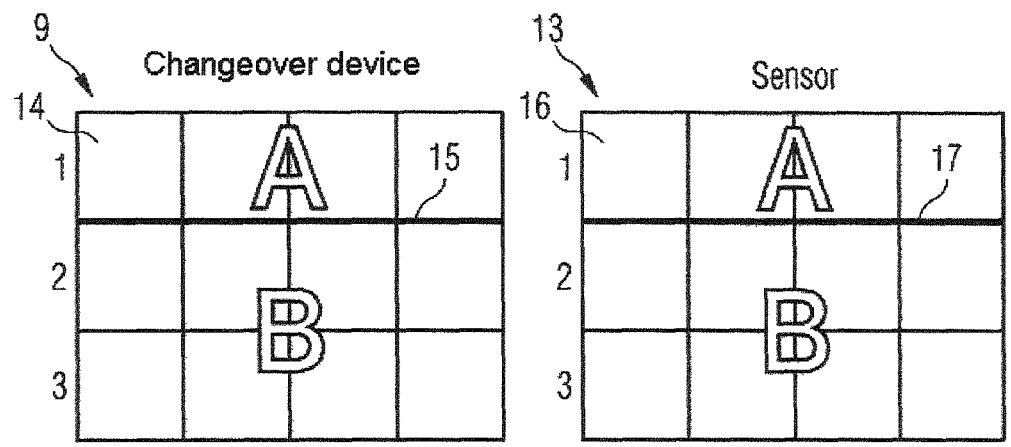
FIG. 3 shows the changeover element and the sensor during the method according to the invention in accordance with the first embodiment variant in a greatly simplified illustration.

In the illustration shown in FIG. 3, the changeover device has the same number of changeover elements as the number of pixels 16 of the sensor 13. In this case, the arrangement of the pixels 16 on the sensor corresponds to the arrangement of the changeover elements 14 in the changeover device. In this embodiment variant, each changeover element 14 images an image point of the first or second partial image onto the corresponding pixel 16 of the sensor 13 depending on the switching setting. By means of a separating line 15, the changeover elements 14 of the changeover device 9 are subdivided into at least two mutually different changeover element groups having mutually different switching settings of the changeover elements 14. In the illustration shown in FIG. 3, one changeover element group is formed by the first line. The latter images an excerpt from the partial image A onto the first pixel line of the sensor 13. The second changeover element group is formed by the lines 2 and 3 and images an excerpt from the partial image B onto the second and third pixel lines of the sensor 13. The image 17 of the separating line 15 on the sensor in this case subdivides the pixels 16 into a pixel group to which the excerpt from the partial image A is fed (first pixel line), and a pixel group to which the excerpt from the partial image B is fed (pixel lines 2 and 3). In this case, the pixels to which an excerpt of the partial image A is fed and the pixels to which an excerpt of the partial image B is fed are determined by the position of the separating line 15 on the changeover device, which separates the changeover elements 14 according to the switching settings thereof.

As is illustrated in FIG. 1, the device according to the invention has a control unit 19, which is connected both to the changeover device 9 and to the sensor 13 via control lines 18, 20. The control is effected such that the changeover device 9 successively assumes a number of switching states that differ from one another with regard to the position of the separating line 15. In the example shown in FIG. 3, six switching states occur, namely: (1) a switching state in which the separating line 15 runs above the first changeover element line, (2) a switching state as illustrated in FIG. 3 and in which the separating line 15 runs between the first and second changeover element lines, (3) a switching state in which the separating line runs between the second and third changeover element lines, (4) a switching state in which the separating line 15 runs above the first changeover element line and in which all changeover elements 14 assume a switching settings interchanged relative to the first switching state, (5) a switching state with the separating line 15 between the first and the second changeover element lines, wherein the changeover elements 14 assume interchanged switching settings relative to the second switching state, and (6) a switching state with the separating line 15 between the second and third changeover element lines, wherein all changeover elements 14 assume interchanged switching settings relative to the second switching state.

In the first switching state 1 (separating line above the first changeover element line), all changeover elements are in a switching setting in which the respective excerpts of the partial image B are fed to the corresponding pixels 16 of the sensor 13. In this switching state, therefore, the entire partial image B is fed to the sensor. In the switching state as seen next, the separating line 15 moves into the position shown in FIG. 3, in which it separates the first changeover element line from the second changeover element line. At the same time, the changeover elements of the first changeover element line assume the second switching setting, in which they feed a first excerpt of the partial image A to the first pixel line of the sensor 13. The changeover elements 14 of the changeover element lines 2 and 3 remain in the switching setting in which they still feed an excerpt of the partial image B to the pixel lines 2 and 3 of the sensor 13. The third switching state is assumed next, in which the separating line 15 is positioned between the second and third changeover element lines. In this switching state, the changeover elements 14 of the first and second changeover element lines are in each case in that switching setting in which they feed an excerpt of the partial image A to the second pixel line of the sensor. Overall, a larger excerpt of the partial image A is thus now fed to the sensor 13, whereas the excerpt of the partial image B that is fed to the sensor is reduced. In the subsequent switching state, the separating line 15 again runs above the first changeover element line 1, all of the changeover elements now having a switching setting in which excerpts of the partial image A are fed to all pixels of the sensor 13. In other words, in this switching state, the complete partial image A is fed to the sensor 13. In a fifth switching state, the separating line 15 moves again between the first changeover element line and the second changeover element line, but the changeover elements 14 of the first line are now in the switching setting in which an excerpt of a subsequent partial image B' is fed to the first pixel line of the sensor 13, whereas the changeover elements of the changeover element lines 2 and 3 of the changeover device 9 are still in the switching setting in which an excerpt of the partial image A is still fed to the pixel lines 2 and 3 of the sensor 13. In the sixth switching state, the separating line 15 again moves between the second and third changeover element lines, wherein the changeover elements 14 of the changeover element lines 1 and 2 assume switching settings in which a corresponding excerpt of the subsequent partial image B' are fed to the pixel lines 1 and 2 of the sensor 13 and the partial image A is fed only to the pixel line 3 of the sensor 13 on account of the corresponding switching setting of the changeover elements 14 of the changeover element line 3. The now following switching state of the changeover device 9 then again corresponds to the first switching state of the changeover device 9, now with the partial image B' instead of the partial image B.

In this case, the control unit 19 therefore controls the change of the switching states of the changeover device 9 such that the previous partial image is furthermore fed to the pixel lines of the sensor 13 that are still to be read, while the subsequent partial image is fed to the pixel lines of the sensor 13 that have already been read. In this case, the control by the control unit 19 is effected such that the image 17 of the separating line 15 on the sensor 13 subdivides the pixels of the sensor 13 into pixel groups, of which one contains the pixels that have already been read and the other contains the pixels that are still to be read. At the same time, the separating line 15 of the changeover device 9 ensures that the partial image fed to the pixel lines that have already been read is a different partial image from that fed to the pixel lines that are still to be read. In this case, the change of the switching states of the changeover device is controlled by the control unit 19 such that a shifting of the separating line 15 on the changeover device, and thus also of its image 17 onto the sensor 13, is synchronized with the reading of the pixel lines of the sensor. That is to say that the separating line 15 is shifted from its position between the first and second changeover element lines into the position between the second and third changeover element lines when the second pixel line is read. In this way, an excerpt of a new partial image is fed to each pixel line whenever the latter has just been read. Said excerpt then remains on the pixel line until the latter is read anew. The exposure duration that can thus be achieved corresponds to the time $T_{ex,rolling}$ from FIG. 2.

In order that the imaging of the excerpts of the partial images and of the separating line 15 onto the sensor 13 can be realized, the changeover device 9 is situated in an intermediate image plane or near the intermediate image plane of the imaging optical unit formed from the optical assemblies 1 to 3.

The succession of the switching states of the changeover device has been described with just three changeover element lines and three sensor lines, for the sake of clarity. However, the number of lines and the number of changeover elements or pixels per line is typically very much greater. In the case of N changeover element lines and N pixel lines, an intermediate image situated on a specific changeover element line is imaged onto exactly one pixel line of the sensor 13. If the i-th line of the sensor is now read, the separating line previously positioned between the i−1-th changeover element line and the i-th changeover element line is correspondingly shifted such that it is now positioned between the i-th changeover element line and i+1-first changeover element line. In other words, the i-th line changes from the pixel group having the pixels that have not yet been read into the pixel group having the pixels that have already been read. If said i-th line was previously assigned to the right partial image, for example, then it is assigned to the left partial image after the change of the switching state. The entire process can be regarded as progressive movement of the stereoscopic partial images over the sensor area, wherein the separating line between the partial images coincides with the separating line between the pixels that have already been read and the pixels that are still to be read. On account of the above-described control, said separating line coincides with the image 17 of the separating line 15 which is present on the changeover device 9 and which, after all, determines which partial image is fed to which part of the sensor.

If the changeover device is realized as a DMD, for example, then the switching setting of the changeover elements is the switching position, i.e. the tilting position, of the tilting mirror elements. The time duration required for the changeover of the mirrors from one switching position into the other is approximately 2 μs. Even for fast cameras this time is shorter than the reading time of a sensor line. Referring to FIG. 2, this means that, if the changeover is effected immediately after the beginning of the reading of a pixel line, the pixel line read already receives the next partial image as soon as it can be exposed again. The time available for the exposure is then substantially determined by the duration of a frame Tframe minus the duration of the reading of a sensor line Tread. In the case of high-quality cameras such as, for example, the model A405 from Basler, the reading time for a pixel line is Tread=3.455 μs. If it were desired to use such a camera to time-sequentially record stereo images with an image refresh rate of 60 Hz, then the camera has to be operated at 120 Hz. That corresponds to a time duration of a frame Tframe of 8.33 ms. It is evident from this that the maximum exposure duration Tex,rolling available for a line, that is to say the maximum integration time, is more than 99% of the duration of a frame Tframe. Therefore, more than 99% of the light afforded can be used for the exposure. By contrast, if, as in the prior art, the changeover device changes from one partial image to the other only when all of the pixel lines have been read, only the time Tframe required for a frame minus the time required for reading all of the pixel lines is available for the exposure. Given a reading time per line of 3.455 μs and 1080 lines, this results in a total reading time for all lines of 1080×3.455 μs=3.73 ms. Therefore, only 8.33 ms−3.73 ms is available for the exposure. Overall, therefore, only 55% of the duration of a frame is then available for the exposure. In other words only 55% of the light can be used for the exposure.

In a less expensive camera model, for instance the A404 from Basler, the reading time per line Tread is 4.56 μs. In this case, too, given an image refresh rate of 120 Hz, more than 99% of the light can be used for the exposure. By contrast, if the changeover of the partial images is effected only after the complete reading of all of the sensor lines, then the time that cannot be used for the exposure is 1080×4.56 μs=4.92 ms. Only 3.41 ms are then available for the exposure, as a result of which only approximately 41% of the light is available for the exposure.

A consumer camera generally cannot be operated faster than at 60 Hz. The reading time per line is approximately 15 μs. The time per frame is approximately 16.6 ms at 60 Hz. In the consumer camera, too, the time available for the exposure is therefore more than 99% of the time per frame. By contrast, if the entire sensor is first read before the exposure with the subsequent partial image takes place, approximately 1080× 15 μs=16.2 ms of the time per frame is lost for the exposure, such that only 2.4% of the duration of the frame is available for the exposure.

These estimations show that, particularly in the case of cost effective cameras, a considerable gain in efficiency can be realized with the device proposed.

Figure 4:
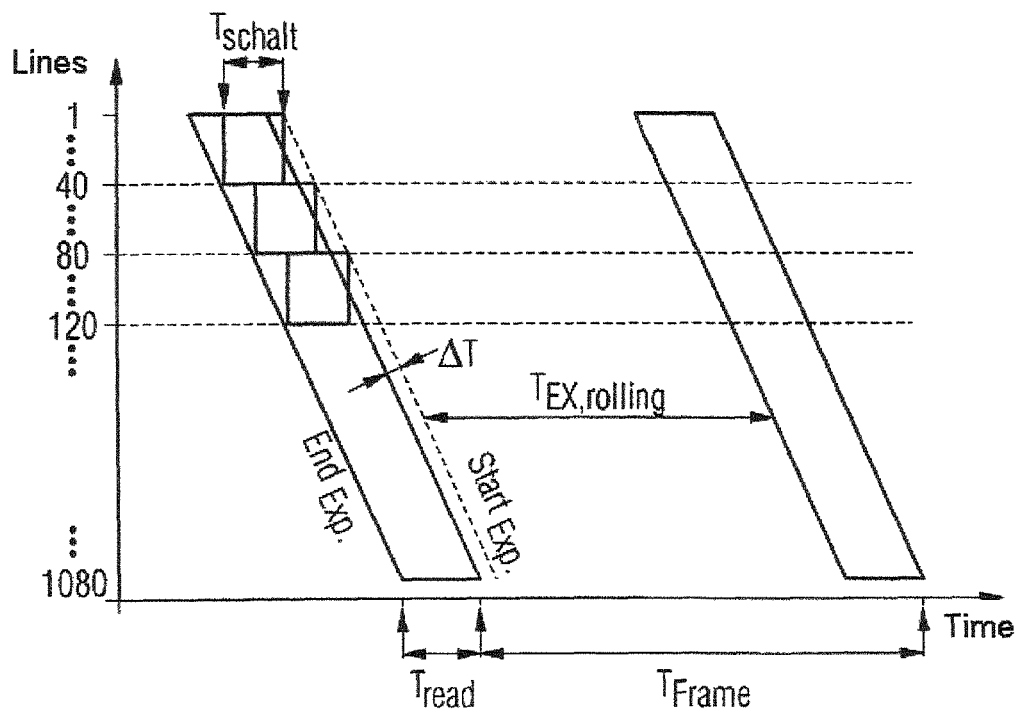
FIG. 4 shows a schematic diagram illustrating the time relationships during the reading of the sensor in a second embodiment variant of the method according to the invention.
Figure 5:
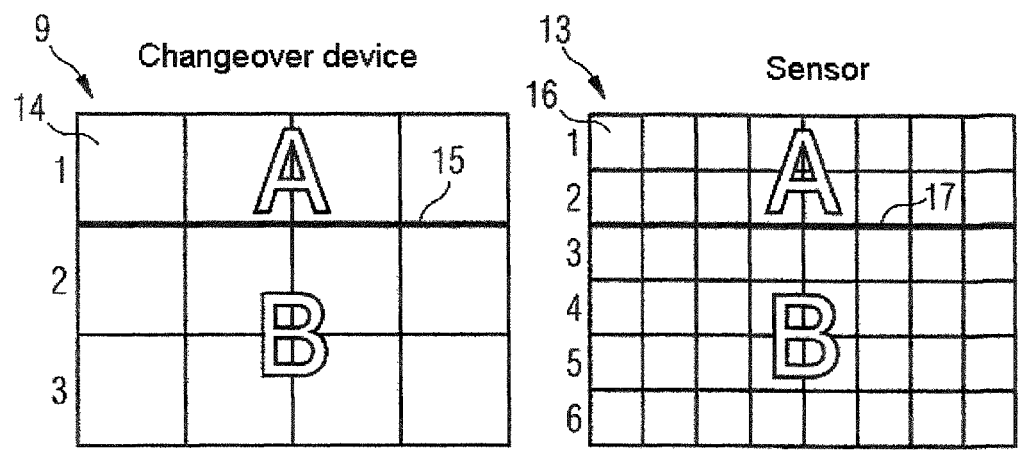
FIG. 5 shows the changeover element and the sensor during the method according to the invention in accordance with the second embodiment variant in a greatly schematic illustration.

In the above-described embodiment of the invention, the number of changeover element lines in the changeover device 9 corresponded to the number of pixel lines in the sensor 13. In general, however, the number of changeover element lines does not correspond to the number of pixel lines. Typically, the number of pixel lines in the sensor 13 is greater than the number of changeover element lines in the changeover device 9. In this case, the intermediate image situated on or in the vicinity of a changeover element line is imaged onto a plurality of pixel lines in the sensor 13. Therefore, the shifting of the separating line between the changeover element lines is permitted to be effected only when all pixel lines onto which the changeover element line images the intermediate image excerpt thereof have been read. The relationships during reading, if the number of pixel lines is greater than the number of changeover element lines, is illustrated in FIGS. 4 and 5. In this case, the illustration from FIG. 4 corresponds to the illustration from FIG. 2, and that from FIG. 5 corresponds to the illustration from FIG. 3.

FIG. 4 shows an example in which the sensor has 1080 pixel lines, whereas the changeover device 9 has only 27 changeover element lines. If the changeover device is situated exactly in the intermediate image plane of the device from FIG. 1, therefore, the intermediate image situated on a changeover element line of the changeover element 9 is imaged onto 40 mutually adjacent pixel lines of the sensor 13. In order to avoid double exposures in said 40 pixel lines, the changeover of the changeover element lines, that is to say the shifting of the separating line 15 by a changeover element line, is effected only when the reading of the last of the 40 pixel lines to which the image of the changeover element line is fed begins, since then the exposure of the last of the 40 pixel lines ends. If the changeover of the changeover element line is ended, a portion of the 40 pixel element lines has already been completely read, and so they are available again for an exposure. However, if image integration were begun immediately after reading, the changeover of the changeover element would take place during image integration. In order to avoid double exposures, the image integration in the pixel lines read is therefore deferred until the reading of the 40th line is begun and the changeover element is switched, such that there is a certain time interval ΔT between the end of the reading of a line and the start of the exposure (line Startwxp). The exposure duration Tex,rolling available for the exposure with the subsequent partial image is therefore reduced by the time ΔT in comparison with the embodiment variant illustrated in FIG. 2.

The assignment of pixel lines to changeover element lines is illustrated once again in FIG. 5. In this figure, the left side shows the changeover device 9, and the right side the sensor 13. In the greatly simplified illustration shown by way of example in FIG. 5, two pixel lines 16 are assigned to each changeover element line 14. The shifting of the separating line 15 on the changeover device 9 then takes place in each case after the reading of the second, fourth and sixth pixel lines.

In the general case in which the changeover device 9 has M changeover element lines and the sensor has N pixel lines, N/M=K pixel lines are assigned to a changeover element line. In order that adjacent pixel lines of the sensor 9 are not influenced by a changeover element line, such that the separation of the partial image channels on the sensor is maintained, the switching state of the changeover device 9 is always changed after K sensor lines have been read. If, by way of example, the lines i to i+K−1 of the sensor 13 are assigned to a line j of the changeover device, than the changeover device 9 changes the switching state if the sensor line i+K—1 is read. The new image integration of the lines read also begins at this point in time. In this way it is ensured that mixing of image information from the right and left stereo channels does not occur during the exposure time. After the changeover time required for changing the switching state of the changeover device 9 has elapsed the exposure of the line i with the next partial image can be begun. If the pixel lines of the sensor 3 are read strictly successively, the time required for reading the K pixel lines amounts to K times the reading time Tread for a single pixel line. Since the changeover of the switching state of the changeover device 9 and the new image integration can already be effected when the K−1 pixel line has been read and the reading of the K-th pixel line is begun, the time Tex,rolling available for the exposure is given by the time duration per frame Tframe minus K−1 times the reading time required for a pixel line and minus the switching time required for the switching of the changeover device 9.

In the case of the example with 27 changeover element lines and 1080 pixel lines as illustrated in FIG. 4, for a DMD having a changeover time per line of approximately 2 µs and a camera model A405 from Basler having a reading time per line of 3.455 µs and a recording rate of 120 Hz, this results in a time period not available for the exposure of (40−1)×3.455 µs+2 ms=137 µs. Given a duration per frame of 8.33 ms, this means that 98% of the duration of a frame for each line is still available for the exposure, which means that approximately 98% of the light afforded is utilized.

In the case of a less expensive camera model such as the A404 Basler, in which the reading time per line is 4.65 µs, the time duration not available for an exposure is (40−1)×4.56 µs+2 µs=180 µs. Here, too, given an image rate of 120 Hz (corresponds to a duration of the frame of 8.33 ms), the light utilization is 98%.

Even in a consumer camera, a proportion of 96% of the time per frame is still available for an exposure. In such a consumer camera in which the reading time per line is approximately 15 µs, the time per frame is therefore reduced by (40−1)×15 µs+2 µs=587 µs. Given a duration of a frame of 16.67 ms (the consumer camera can typically be operated only at an image rate of 60 Hz), therefore, approximately 96% of the time per frame is still available for the exposure.

The examples show that in an arrangement comprising a structured changeover device for changeover between the partial image channels, wherein the changeover device is situated in the intermediate image plane, with the use of a camera having a rolling shutter and the described synchronization between the reading of the pixel lines of the sensor 13 and the changeover of the switching state of the changeover device 9, the utilization of the available illumination light can be increased to more than 90% in comparison with arrangements according to the prior art, even if the changeover device has significantly fewer lines than the sensor.

Figure 6:
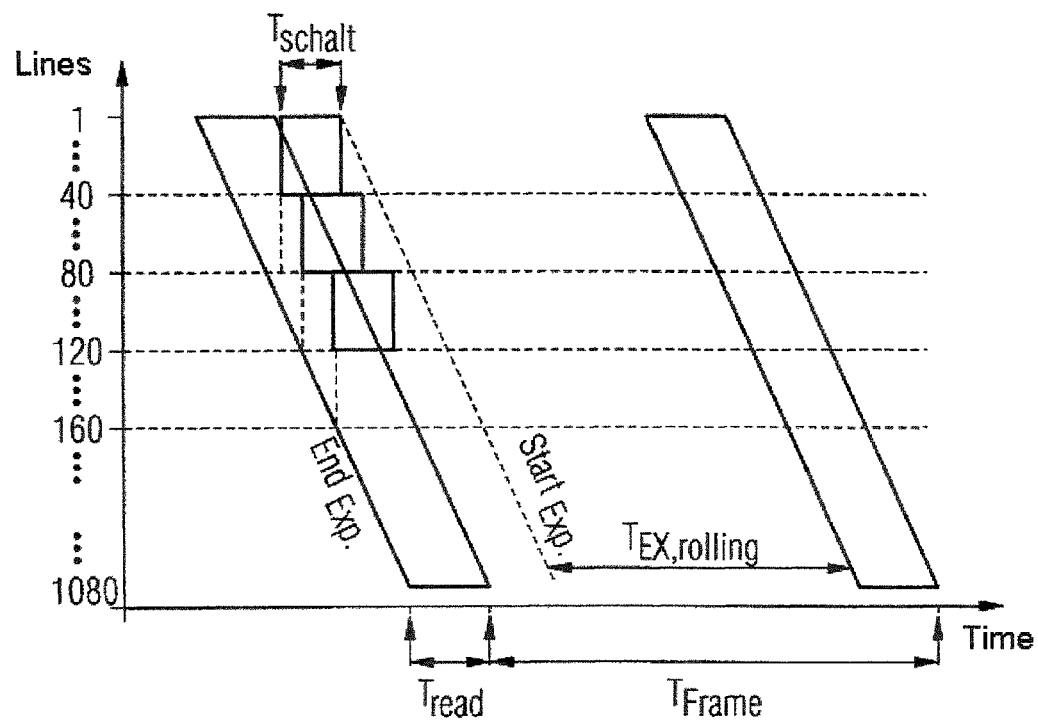
FIG. 6 shows a schematic diagram illustrating the time relationships during the reading of the sensor in a third embodiment variant of the method according to the invention.

If the structured changeover device is positioned exactly in the intermediate image plane of the device shown in FIG. 1, Moiré effects can occur on account of superimpositions of the structure of the changeover device and the structure of the sensor. Said effects can be avoided if the changeover device is not positioned exactly in the intermediate image plane, but rather slightly upstream or downstream of the intermediate image plane. The intermediate image arising on the changeover device is then slightly blurred. This has the consequence that, if K pixel lines are assigned to a changeover element line, the partial image of the changeover element line is imaged onto K'>K pixel lines. For this reason, a changeover element line of a changeover device not situated in an intermediate image plane is permitted to change its switching setting only when K'−1 lines of the sensor 13 have been read. With the changeover, the next image integration in these K' lines then begins. FIG. 6 schematically shows the relationships during the reading of the lines if the changeover device 9 is not situated exactly in the intermediate image plane. If, by way of example, the number of pixel lines assigned to a changeover element line is K=40 and the number of pixel lines influenced by a changeover element line is K'=80 then the changeover of the switching state of the changeover device and the beginning of the new image integration take place only with the beginning of the reading of the 80th pixel line i.e. after 79 pixel lines have been read. The time duration available for an exposure of a pixel line then results from the duration of a frame minus the time duration required for the reading of the 79 pixel lines and minus the time duration required for the changeover of the switching state of the changeover device. In the case of a camera such as the A405 from Basler, this results in a maximum exposure time per line which corresponds to the duration of a frame reduced by (80−1)×3.455 µs+2 µs=275 µs. Consequently, 99.5% of the duration of a frame is still available for the exposure. Even in the example with the consumer camera, around 93% of the duration of a frame is still available for the exposure.

Even if the switching time for example for the mirrors of a DMD is only approximately 2 µs it is often not possible, however, for arbitrary mirrors to be changed over at any time. Depending on the method of writing the image information to the DMD, the time required between the update of two images, that is to say for shifting the separating line 15 on the changeover device 9, is approximately 80 µs (depending on the resolution of the DMD and the electronics). Advantageously, however, a DMD is used in which the image is written to the DMD with a so-called "phased reset". In the case of a "phased reset", analogously to the reading of a camera image with a rolling shutter, the image is written to the DMD in blocks of 8 lines, wherein the time between writing two blocks each having 8 lines is between 2 and 10 µs, in particular approximately 5 µs, depending on DMD and electronics. In particular, driving of the DMD can be chosen such that the reading of the camera image and the writing of an image in the DMD proceed temporally synchronously.

Figure 7:
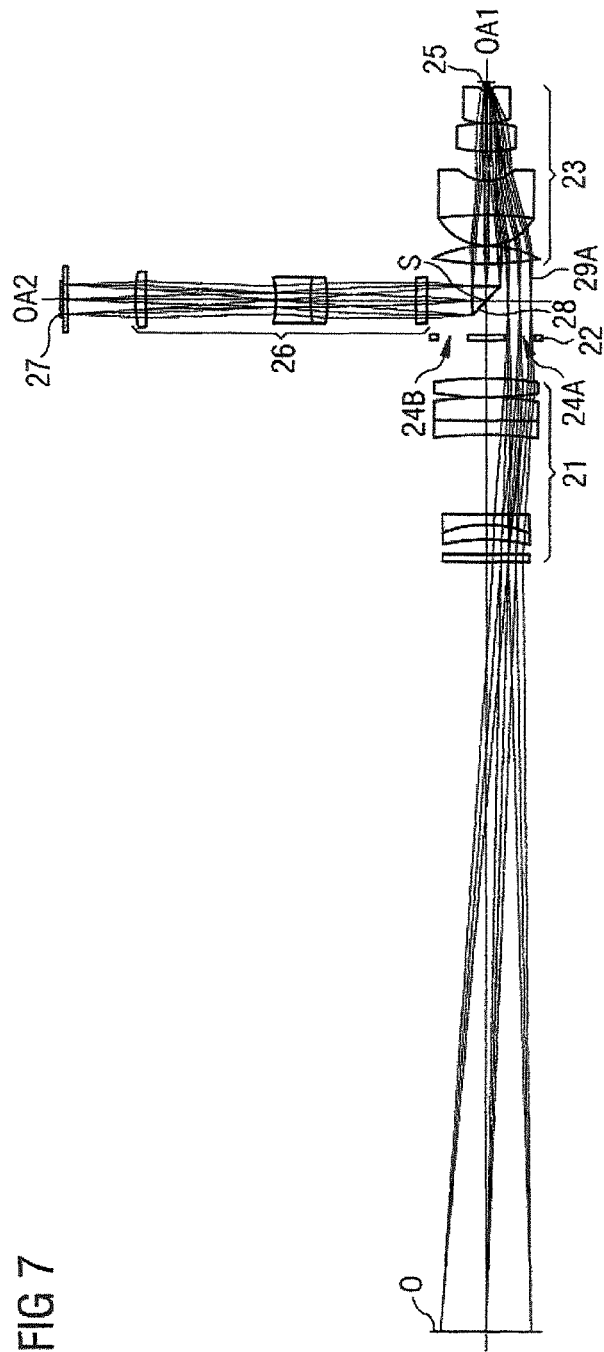
FIG. 7 shows a first concrete embodiment variant for the optical components of the device from FIG. 1, wherein the first partial beam path of a stereoscopic image is depicted.
Figure 8:
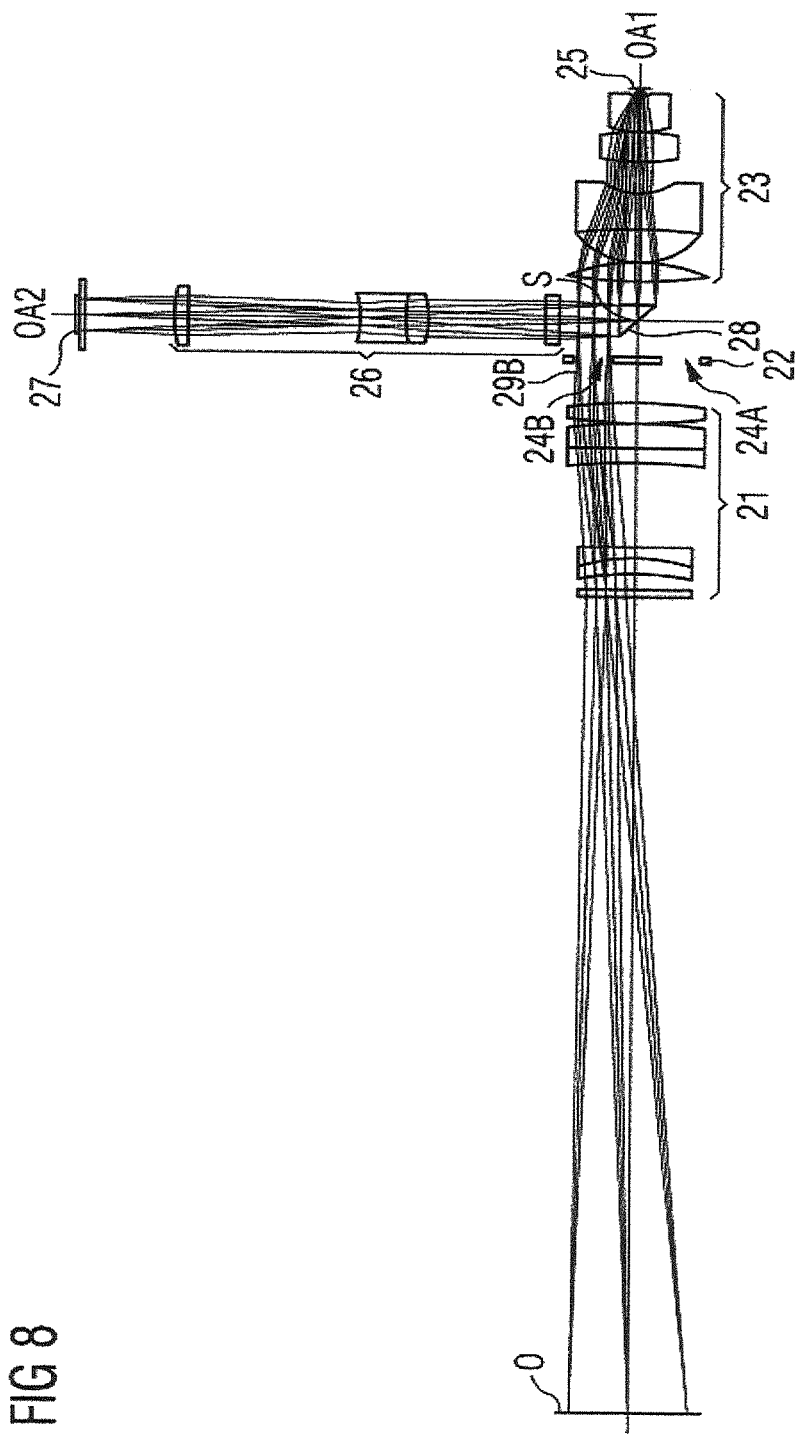
FIG. 8 shows the optical components from FIG. 7, wherein the second stereoscopic partial beam path of the stereoscopic image is depicted.

A first concrete embodiment variant for the device for the time-sequential recording of three-dimensional images from FIG. 1 is illustrated in FIGS. 7 and 8. A reflective changeover device is used in this embodiment variant. While FIG. 7 illustrates the first partial beam path of a stereoscopic image, FIG. 8 illustrates the second partial beam path of the stereoscopic image.

The first concrete embodiment variant of the device according to the invention, which is embodied as a surgical microscope in the present exemplary embodiment, comprises a main objective 21, an aperture stop 22 as partial beam generator, an intermediate imaging optical unit 23 and, as changeover device, a tilting mirror matrix 25, which are arranged one behind another along a first optical axis section OA1 from the object side toward the observer side. Furthermore, the surgical microscope comprises a camera adapter optical unit 26 and an electronic image sensor 27, which are arranged one behind another along a second optical axis section OA2 from the object side toward the observer side. The first optical axis section OA1 and the second optical axis section OA2 together form a folded optical axis of the observation device and intersect at an intersection point S at an angle of 90°. A deflection element 28 is arranged at the intersection point S, and deflects a beam of rays that emerges from the tilting mirror matrix 25 and passes through the intermediate imaging optical unit 23 in the direction of the second optical axis section OA2. In the concrete embodiment variant described with reference to FIGS. 7 and 8 the main objective 21 corresponds to the first optical assembly from FIG. 1, the intermediate imaging optical unit 23 corresponds to the second optical assembly, and the intermediate imaging optical unit 23, through which each partial beam path passes twice, together with the camera adapter optical unit 26 corresponds to the third optical assembly.

In the present embodiment variant, the main objective 21 is embodied as an objective having a variable focal length. Such objectives are also called vario-objectives or varioscopes and can comprise, for example, an object-side lens group and an observer-side lens group, wherein the observer-side lens group is arranged such that it is displaceable along the optical axis. The varioscope of the exemplary embodiment comprises a first lens combination and a second lens combination, which are arranged in a manner displaceable with respect to one another along the optical axis. By displacing the observer-side lens group, in the present exemplary embodiment it is possible to vary the working distance between the surgical microscope and the object, that is to say the distance between the focal plane of the main objective 21 and the first lens surface of the main objective 21.

In the present exemplary embodiment, the focal length of the main objective 21 is 336.88 mm. All optical surface of the main objective are embodied as rotationally symmetrical with respect to the first optical axis section OA1. The main objective 21 collimates the object-side beams of rays, that is to say that it images them substantially to infinity and in this case has a real mechanically accessible exit pupil in a predetermined plane between the main objective 21 and the intermediate imaging optical unit 23. In the present exemplary embodiment the midpoint of the deflection element 28 is arranged in said exit pupil plane. Situated directly adjacent to the deflection element 28, that is to say also in direct proximity to the exit pupil plane, is the aperture stop 22, which has two stop openings 24A and 24B, which cut out the pupils of the two stereo channels of the surgical microscope from the overall beam path. Whereas on the object side of the stop 22, therefore, a beam path is present which passes through the lens elements in at least the greatest part of their total cross-sectional area in a centered fashion with respect to the first optical axis section OA1, on the image side of the aperture stop 22 two partial beams of rays are present, which each pass through only a part of the cross-sectional areas of the optical elements.

The intermediate imaging optical unit 23 has four lenses, wherein one lens is embodied as a cemented element. Overall, the intermediate imaging optical unit 23 is embodied as a converging optical unit having a focal length which is an order of magnitude smaller than the focal length of the main objective 21 and typically in the range of between 0.5% and 10% of the focal length of the main objective 1. In the present exemplary embodiment, the focal length of the intermediate imaging optical unit 23 is f=24.57 mm. The intermediate imaging optical unit 23 generates, from a partial beam of rays coming from the aperture stop 22, an intermediate image in the region of the tilting mirror matrix 25. Like the main objective 21, the intermediate imaging optical unit in the present exemplary embodiment, with regard to the correction of imaging aberrations, has a plurality of lenses. Thus, in the present exemplary embodiment, four lenses are present, one of which is embodied as a cemented element. At least one of the lens surfaces in the intermediate imaging optical unit 23 is in this case advantageously embodied in aspherical fashion.

The tilting mirror matrix 25 is arranged in the region of the intermediate image generated by the intermediate imaging optical unit 23. Advantageously, the tilting mirror matrix 25 is in this case arranged or the intermediate imaging optical unit 23 is embodied such that a sharp intermediate image does not arise at the location of the tilting mirror matrix 25, rather a slightly defocused intermediate image or intermediate image beset by imaging aberrations is intentionally generated. Moiré effects caused by the periodic structures of the tilting mirror matrix 25 and of the image sensor 27 can thereby be minimized.

In the present exemplary embodiment, the tilting mirror matrix 25 is embodied as an arrangement of micromirrors which can be switched to and fro by a deflection angle in a bistable manner between two tilting positions about a common axis. Standard components of this type are sold commercially under the trade designation "DMD" (Digital Micromirror Device) in various embodiments.

In one tilting position, the tilting mirror elements reflect the partial beam 29A of rays of the stereo channel defined by the stop opening 24A of the aperture stop back into the intermediate imaging optical unit 23 (cf. FIG. 7), whereas the tilting mirror elements in the second position reflects the partial beam 29B of rays of the stereo channel defined by the second stop opening 24B of the aperture stop 22 back into the intermediate imaging optical unit 23. The partial beam of rays respectively not reflected back into the intermediate imaging optical unit 23 is reflected by the tilting mirror elements into a region having high absorption. This region can be embodied in particular as a light trap (not illustrated), for instance as a light trap such as described in US 2010/0182681 A1. Reference is therefore made to the content of said publication with regard to a possible configuration of the light traps. In the present exemplary embodiment, a dedicated light trap is provided for each stereo channel.

The deflection element 28 arranged between the aperture stop 22 and the intermediate imaging optical unit 23 serves for folding the optical axis and is embodied as a mirror surface in the present exemplary embodiment. Alternatively, however, it can also be embodied as a prism surface, as an optical grating, as a hologram, etc. In the present exemplary embodiment, the normal to the mirror surface forms an angle of 45° with the first optical partial axis section OA1 such that the optical axis is folded by 90°. As already mentioned, the deflection element 28 is arranged in the exit pupil of the main objective 21.

In the present exemplary embodiment, the camera adapter optical unit 26 disposed downstream of the deflection element in the direction of the image sensor 27 is embodied as an a focal zoom system. As such, in the present exemplary embodiment, it comprises three lenses or lens groups, of which the lens facing the image sensor 27 is arranged in stationary fashion and the two lenses or lens groups are arranged in a displaceable manner along the second optical axis section OA2. Preferably, the zoom optical unit has a stationary entrance pupil plane arranged at the location of the deflection element 28 or, if this is not possible, arranged in the vicinity thereof. In contrast to the exemplary embodiment illustrated, the deflection element can be integrated into the camera adapter optical unit 26. In this case, e.g. the object-side lens of the camera adapter optical unit 26 could be arranged between the deflection element 28 and the intermediate imaging optical unit 23.

In one particular advantageous configuration of the concrete embodiment variant of the device for the time-sequential recording of three-dimensional images that is illustrated in FIGS. 7 and 8, the optical properties of the main objective 21 and of the intermediate imaging optical unit 23 are coordinated with one another such that the exit pupil plane of the main objective 21 and the entrance pupil of the intermediate imaging optical unit 23 and also the exit pupil of the intermediate imaging optical unit 23 lie in the same plane. Advantageously, the aperture stop 22 and the deflection element 28 are additionally arranged in or in the greatest possible proximity to the said plane. Furthermore, the optical properties of the camera adapter optical unit 26 are advantageously embodied such that its entrance pupil coincides with the exit pupil of the intermediate imaging optical unit 23 (with the aid of the deflection element). As a result of the abovementioned arrangement of the pupil planes and of the aperture stop 22 and of the deflection element 28 in a common plane or closely adjacent to said plane, it is possible to minimize the diameters of all subsystems, thus resulting in a particularly compact overall arrangement.

The functioning of the surgical microscope illustrated in the first concrete embodiment variant is explained in greater detail below. FIG. 7 shows the course of the partial beam 29A of rays of the first stereo channel from the object plane O into the image sensor 27 in a sectional view in the plane spanned by the two optical axis sections OA1 and OA2, and FIG. 8 shows the course of the partial beam 29B of rays of the second stereo channel from the object plane O into the image sensor 27. The sectional views illustrate the beams of rays proceeding from three object points in each case with a chief ray and marginal rays. The two outer beams of rays represent the boundary of the object field that can be imaged, and the central beam of rays represents the midpoint of said object field. For the sake of clarity, that partial beam of rays which is respectively deflected into the light trap is not illustrated in both figures. Likewise, all parts of the beam of rays passing through the main objective 21 which do not pass through the stop opening of the aperture stop 22 are also omitted for the sake of clarity.

FIG. 7 shows the course of the partial beam 29A of rays of the first stereo channel to the image sensor 27. In this case, the first stereo channel is defined by the stop opening 24A of the aperture stop 22. After the partial beam 29A of rays has been defined by means of the aperture stop opening 24A it passes through the intermediate imaging optical unit 23 in an acentric fashion with respect to the first optical axis section OA1 and is imaged onto the tilting mirror matrix 25 in a slightly defocused fashion by said intermediate imaging optical unit. In FIG. 7, the tilting mirror elements of the tilting mirror matrix 25 are in a first switching state, in which all tilting mirror element lines reflect the partial beam 29A of rays back into the intermediate imaging optical unit 23. In this case, the reflected-back partial beam of rays runs largely in a centric fashion, advantageously completely in a centric fashion, with respect to the first optical axis section OA1. The partial beam of rays of the second stereo channel, this partial beam of rays being defined by the aperture stop opening 24B and not being illustrated in FIG. 7, is reflected into the light trap by the tilting mirror matrix 25 in this tilting position of the tilting mirror elements.

The partial beam 29A of rays of the first stereo channel, this partial beam of rays being reflected back into the intermediate imaging optical unit 23, passes through the intermediate imaging optical unit 23 largely in a centric fashion, advantageously completely in a centric fashion, with respect to the first optical axis section OA1. During its first passage through the intermediate imaging optical unit 23, that is to say during its passage in the direction of the tilting mirror matrix 25, by contrast, the course of this partial beam of rays was acentric. In this case, the acentricity during this passage is predefined by the acentricity of the aperture stop opening 24A. By virtue of the fact that the two passages through the intermediate imaging optical unit involve passing through different regions of the optical surfaces, there is the possibility of configuring the intermediate imaging optical unit 23 such that imaging aberrations which arise during the first passage of the partial beam 29A of rays and imaging aberrations which arise during the second passage mutually compensate for one another wholly or at least in part. For this purpose, the intermediate imaging optical unit 23 in the exemplary embodiment has at least one aspherical lens surface which is arranged in a region of the beam path in which the partial beam 29A of rays before reflection at the tilting mirror matrix 25 and the partial beam 29A of rays after reflection at the tilting mirror matrix 25 have no or only little overlap. This condition is met in particular in the vicinity of the plane in which the exit pupil of the main objective and the aperture stop are situated. Accordingly, in the present exemplary embodiment, the lens facing the aperture stop 22 has the aspherical lens surface of the intermediate imaging optical unit 23. Since, in accordance with the law of refraction, all light paths have to be reversible, although in the intermediate imaging optical unit upon double passage of the beam 29A of rays all image aberration components having an antisymmetrical dependence on the image field coordinate, for example coma aberrations, distortion aberrations and chromatic magnification differences, would exactly compensate for one another, this self-compensation is disturbed firstly by the breaking of the symmetry on account of the deflection of the partial beam 29A of rays at the tilting mirror matrix 25 and secondly by the arrangement of the tilting mirror matrix 25 not exactly at the location of the intermediate image. In this case, however, the use of at least one aspherical lens surface nevertheless enables substantial self-compensation at least for monochromatic image aberrations.

After reflection at the tilting mirror matrix 25 and the passage through the intermediate imaging optical unit 23 the partial beam 29A of rays is deflected by the deflection element 28 largely in a centric fashion, advantageously completely in a centric fashion, with respect to the second optical axis section OA2 into the camera adaptor optical unit 26. After passing through the camera adapter optical unit 26, the partial beam of rays then impinges on the image sensor 27.

If, in another switching state of the tilting mirror matrix 24, all tilting mirror elements are in the second tilting position (FIG. 8), then the partial beam 29B of rays of the stereo channel defined by the aperture stop opening 24B, after an acentric first passage through the intermediate imaging optical unit 25, is reflected by the tilting mirror matrix 25 in the direction of the deflection element 28, wherein it once again passes through the intermediate imaging optical unit 23 largely in a centric fashion, advantageously completely in a centric fashion, with respect to the optical axis section OA1. It is then deflected by the deflection element 28 in the direction of the image sensor 27 largely in a centric fashion, advantageously completely in a centric fashion, with respect to the optical axis section OA2. The partial beam 29A of rays of the other stereo channel, this partial beam of rays not being illustrated in FIG. 8, is deflected into the light trap, by contrast, by means of the tilting mirror elements of the tilting mirror matrix 25 in the second tilting position.

In other switching states of the tilting mirror matrix, a group of tilting mirror element lines is situated in that tilting position which deflect the first partial beam 29A of rays toward the image sensor, whereas the other group of tilting mirror element lines is situated in a tilting position in which the second partial beam 29B of rays is deflected toward the image sensor 27. In this case, the two groups are separated from one another by the separating line described above, wherein the position of the separating line on the tilting mirror matrix is dependent on the driven switching state. Depending on the position of the separating line, different excerpts of successive partial images can then be fed simultaneously to the image sensor 27.

As is evident from FIGS. 7 and 8, the fact that the tilting mirror matrix 25 reflects a partial beam 29A, 29B of rays that has passed in an acentric fashion through the intermediate imaging optical unit 23 back through the intermediate imaging optical unit 23 largely in a centric fashion makes it possible to direct the partial beams 29A, 29B of rays of both stereo channels alternately through the same camera adapter optical unit 26 onto the same image sensor 27. In this way, with the optical observation device it is possible to provide a common recording optical unit and a common image receiver for both stereoscopic partial beam paths. In this case, it is particularly advantageous if the beams of rays reflected back into the intermediate imaging optical unit 23 by the tilting mirror matrix 25 run completely in a centric fashion, since the cross-sectional area of the optical elements arranged downstream can then be utilized optimally.

In contrast to the solutions known in the prior art, it is possible to minimize fundamental light losses with the optical arrangement illustrated in FIGS. 7 and 8, since no switching of liquid crystal diaphragms or the like is necessary. In contrast to solutions in which mechanical shutters such as rotating shutters, for instance, are used, the arrangement illustrated affords the advantage that the changeover frequency can be abruptly changed since large sluggish masses such as would be constituted by a rotating shutter, for example, are not necessary. Moreover, the small masses of the moving parts (tilting mirror elements) scarcely lead to disturbing oscillations.

Further details of the optical observation device described with reference to FIGS. 7 and 8 and modifications thereof are described in the German patent application DE 10 2011 010 262. Therefore the content of said application is incorporated by reference in the present application, in particular with regard to the further details of the optical observation device and with regard to possible modifications.

Although the main objective 21 in the present exemplary embodiment is embodied as a varioscope it is also possible to equip the device with a main objective having a fixed focal length. In this case, an objective having a fixed focal length can also have two lens groups arranged at a distance from one another along the optical axis. However, it is also possible to use, instead of a main objective having a fixed focal length and having two lens groups, a main objective having a fixed focal length and having fewer lenses. Main objectives having a plurality of lenses are advantageous, however, since imaging aberrations downstream of the main objective can thereby be reduced.

The tilting mirror matrix used in the embodiment variant described with reference to FIGS. 7 and 8 is a DMD that is a chip having a diagonal of 7.62 mm (0.3 inch) and a pixel spacing of 10.8 µm. In a DMD of this type, an area of 3.52 mm×1.98 mm is used, which corresponds to approximately 185 lines. For the ratio of pixel lines of the sensor (having 1080 lines) to changeover element lines (tilting mirror lines), this results in around 6 pixel lines per tilting mirror line. If the ratio K is multiplied by a factor 2 for a certainty in order to avoid the influencing of pixel lines by tilting mirror lines on account of the fact that the tilting mirror matrix is not situated exactly in the intermediate image, then a ratio K' of pixel lines to tilting mirror lines of approximately K'=12 is obtained. The maximum exposure duration per pixel line then results as the duration of a frame reduced by (12−1)×3.455 µs+2 µs=40 µs for the camera model A405 from Basler. Given a duration of a frame of 8.33 ms, this corresponds to use of more than 99% of the light afforded. Even for the example with the consumer camera, the use is still almost 99% of the light afforded. In comparison with the prior art, the light utilization can thus be at least approximately double. Since the fundamental light loss is additionally minimized, the device in accordance with the first concrete embodiment variant has an extremely high efficiency in terms of the luminous efficiency.

A second concrete embodiment variant for the device shown in FIG. 1 is illustrated in FIGS. 9 and 10, wherein FIG. 9 shows the course of the first stereoscopic partial beam path and FIG. 10 shows the course of the second stereoscopic partial beam path. This embodiment variant differs from the first concrete embodiment variant illustrated in FIGS. 7 and 8 inter alia in that a transmissive changeover device is employed instead of a reflective changeover device. The of a use of the transmissive changeover device, in comparison with the use of a reflective changeover device, affords the possibility of arranging all optical components in a linear sequence, but in return has somewhat higher light losses than the device in accordance with the first concrete embodiment variant. In the second embodiment variant, the partial beam paths are separated with the aid of orthogonal polarization states instead of with the aid of the angle of incidence on the changeover device as in the first embodiment variant.

The device in accordance with the second concrete embodiment variant comprises a main objective 31, which constitutes the first optical assembly and which can be constructed, in principle, in accordance with the main objective in the first concrete embodiment variant.

A partial beam generator is disposed downstream of the main objective on the observer side, said partial beam generator being formed by two polarizers 32A, 32B which generate mutually orthogonal polarization states. In this case the polarizer 32A polarizes the light of the first partial beam 39A of rays in a first polarization state P1 and the polarizer 32B polarizes the light of the second partial beam 39B of rays in a second polarization state P2, which is orthogonal with respect to the first polarization state P1. By way of example, an aperture stop such as has been described with reference to the first concrete embodiment variant can be present for generating the two partial beams 39A, 39B of rays. In particular, in this case the polarizers can be arranged in the stop openings. Alternatively, however, the stop can also be embodied as a virtual stop. In this case, the position of the partial pupils of the two partial beams of rays can be defined via a deflection prism, yet to be described, and a beam splitter or polarization beam splitter, yet to be described, wherein the size of the partial pupils is defined by the size of the optical elements disposed downstream of the main objective 31.

A deflection element is disposed downstream of one polarizer 32A on the observer side, said deflection element being embodied as a deflection prism 34A in the present exemplary embodiment. In this case, the deflection prism is arranged acentrically with respect to the optical axis OA in such a way that only the partial beam 39A of rays is deflected by it in a direction perpendicular to the optical axis.

A beam splitter 34B is arranged opposite the deflection prism 34A mirror-symmetrically with respect to the optical axis OA, said beam splitter being embodied as a polarization beam splitter prism in the present exemplary embodiment. It reflects light in the polarization state P1 and transmits light in the polarization state P2. Therefore, it reflects by 90° the partial beam of rays (having the polarization state P1) incident from the deflection prism 34A in a direction perpendicular to the optical axis OA, such that said partial beam of rays now runs parallel and in an acentric fashion with respect to the optical axis OA. The second partial beam 39B of rays (having the polarization state P2) is not reflected, but rather passes through the beam splitter, such that it still runs parallel and in an acentric fashion with respect to the optical axis OA. All optical elements arranged on the observer side of the deflection prism 34A and of the beam splitter prism 34B have a partial optical axis OA' running parallel to the main optical axis OA but in an acentric fashion with respect thereto. The lateral dimensions of these optical elements arranged on the observer side with respect to the beam splitter prism 34B are then no longer adapted to the diameter of the total beam of rays, but rather only to the diameter of a partial beam of rays, as a result of which they can be kept significantly smaller than the main objective 31.

An intermediate imaging optical unit 33 is arranged in a manner disposed downstream of the beam splitter prism 34B along the partial optical axis OA' on the observer side. Said intermediate imaging optical unit generates an intermediate image of the observation object in an intermediate image plane, in which or in the vicinity of which the changeover device is arranged. In the present case, the changeover device is arranged in the vicinity of the intermediate image plane in order to suppress Moiré effects. In the present embodiment variant, the changeover device is embodied as a structured liquid crystal display (LCD) 35. The latter has the property that, depending on driving, either it leaves unchanged the polarization state of a partial beam of rays passing through or it changes the polarization state of a partial beam of rays passing through to the respective other polarization state, that is to say P1 to P2 and P2 to P1. An analyzer 38 is disposed downstream of the liquid crystal display 35, said analyzer allowing only one of the two polarization states to pass. If, by way of example, the partial beam 39A of rays then has a linear polarization having the polarization direction P1 and the partial beam 39B of rays has a linear polarization having the polarization direction P2, which is perpendicular to the first polarization direction P1, than they still have the same polarization directions after passing through the liquid crystal display in the first switching state of the display. If the analyzer 38 then allows the polarization direction P1 to pass, only the first partial beam 39A of rays, which still has the polarization direction P1, can pass through the analyzer. By contrast, the second partial beam 39B of rays, which still has the polarization direction P2, is blocked by the analyzer 38. If the liquid crystal display 35 is in the second switching state, the polarization directions of the partial beams of rays are rotated by 90°. After passing through the liquid crystal display 35, the first partial beam 39A of rays therefore has the polarization direction P2 and the second partial beam 39B of rays has the polarization direction P1. In this case, the second partial beam 39B of rays can pass through the analyzer 38, whereas the first partial beam 39A of rays is blocked by the analyzer 38.

The liquid crystal display used in the second concrete embodiment variant can be realized in the form of a transmissive liquid crystal image generator, for example, in which the two polarizers enclosing the liquid crystal are removed. The switching states in this case correspond to a white and a black pixel, respectively. It should be noted at this juncture that the description on the basis of linearly polarized light having polarization directions P1 and P2 has been chosen merely for explanation purposes. In general, it is possible to use two orthogonal polarization states, that is to say, for example, also circularly polarized states, of which one is left circularly polarized and the other is right circularly polarized.

On the image side, the analyzer 38 is followed by a camera adapter optical unit 36, which in the present exemplary embodiment is configured in accordance with the camera adapter optical unit 26 in the first concrete embodiment variant. The camera adapter optical unit 36 is finally followed by the image sensor 37.

Since the liquid crystal display 35 arranged in or in the vicinity of the intermediate image plane has a spatial structure in the form of pixel lines and pixel columns and can be switched pixel by pixel, in this embodiment variant, too, an assignment of lines of the changeover device, here of the liquid crystal display 35 to lines of the image sensor 37 can be performed. In this case, a separating line between changeover element lines corresponds to a separating line between pixel lines of the liquid crystal display 35. The separating line subdivides the liquid crystal display into two regions, wherein the pixels in one region assume that state in which the polarization state of the light passing through is changed, while the pixels of the other region assume that state in which they leave unchanged the polarization state of light passing through. Since the polarization state determines which of the two partial images reaches the image sensor 37, excerpts of different partial images can thus be fed simultaneously to the image sensor. The time-sequential feeding of the partial images is then effected in accordance with one of the variants of the method according to the invention as described with reference to FIGS. 3 to 6.

Although polarizers 32A, 32B and a polarization beam splitter prism 34B have been used with reference to FIG. 9 and the device can, in principle, also be realized without polarizers 32A, 32B. The light emerging from the polarization beam splitter would then assume the polarization state P1 or the polarization state P2 depending on whether it was reflected or passed through without reflection. In the exemplary embodiment shown in FIGS. 9 and 10, the light of the first partial beam 39A of rays would be in the polarization state P1, for example, after reflection by the polarization beam splitter 34B, whereas the light of the second partial beam 39B of rays, which passes through the polarization beam splitter without reflection, would be in the polarization state P2. However, the purity of the polarization states can be increased with the aid of the polarizers 32A, 32B.

In the second concrete embodiment variant, the main objective 31 corresponds to the first optical assembly from FIG. 1, the imaging optical unit 33 together with the deflection prism 34A and the beam splitter or polarization beam splitter 34B corresponds to the second optical assembly, and the camera adapter optical unit 36 corresponds to the third optical assembly. If no polarizers 32A, 32B are used, the deflection prism and the beam splitter constitute the partial beam generator.

A third concrete embodiment variant for the device for the time sequential recording of three-dimensional images as shown in FIG. 1 is illustrated in FIGS. 11 to 14. The fundamental construction of the third concrete embodiment variant corresponds to the fundamental construction of the second concrete embodiment variant described with reference to FIGS. 9 and 10, but the polarizers 32A, 32B of the second embodiment variant are replaced by spectral filters 42A, 42B in the third embodiment variant. The liquid crystal display 35 and the analyzer 38 from the second embodiment variant are replaced by a spectral filter wheel 45 in the third embodiment variant. Moreover, the third embodiment variant comprises a main objective 41, a deflection prism 44A, a beam splitter prism 44B, an intermediate imaging optical unit 43, a camera adapter optical unit 46 and an image sensor 47. The construction and the arrangement of these optical components correspond to the corresponding optical components of the second concrete embodiment variant and will therefore not be described again at this juncture. It should merely be noted that a diachroic beam guide 44B is used instead of the polarization beam splitter in the third concrete embodiment variant.

Figure 13:
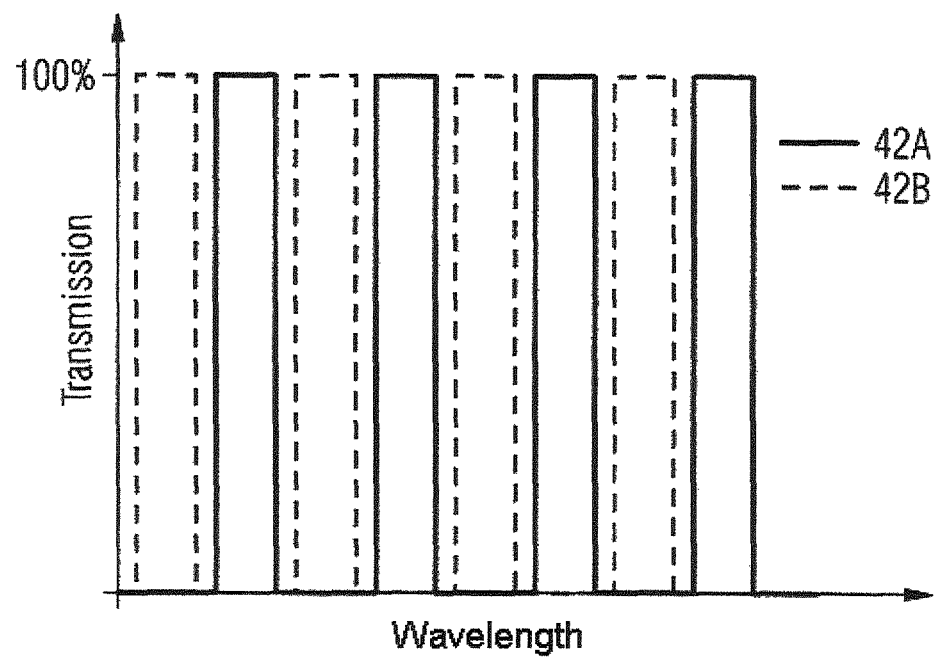
FIG. 13 shows the filter curves of filters which are used in the device shown in FIGS. 11 and 12.

In the third concrete embodiment variant, the partial beam paths 49A, 49B are separated with the aid of different spectral properties instead of with the aid of different polarization states. The spectral properties are impressed on the partial beam paths by means of the spectral filters 42A, 42B. Said filters have the property that they each transmit only those wavelength ranges which are blocked by the respective other filter. Corresponding spectral profiles of the two filters are illustrated in FIG. 13. This figure shows the transmission of the two filters 42A, 42B as a function of the wavelength. In this case, the solid line shows the spectral transmission characteristic of the spectral filter 42A and the dashed line shows the transmission characteristic of the spectral filter 42B.

Each spectral filter has a number of wavelength ranges in which there is a very high transmission and which are separate from wavelength ranges in which there is substantially no transmission. The wavelength ranges in which there is a very transmission form a number of transmission bands of the respective filter. Four transmission bands are depicted for each spectral filter in FIG. 13. In each filter, the transmission bands alternate with wavelength ranges in which there is substantially no transmission. The width of the wavelength ranges without transmission and the width and position of the transmission bands of the two spectral filters are coordinated with one another such that the transmission bands of the spectral filter 42B lie exactly in those wavelength ranges of the spectral filter 42A in which the latter has substantially no transmission. Accordingly, the transmission bands of the spectral filter 42A lie in those wavelength ranges of the spectral filter 42b in which the latter has substantially no transmission. In this way, the transmission bands of the spectral filters 42A and 42B alternate without there being an overlap between two transmission bands. Moreover, the distribution of the transmission bands of the two spectral filters 42A, 42B is in each case preferably chosen such that the transmitted wavelength ranges in total produce white light.

With the aid of the spectral filters 42A, 42B, different spectral characteristics are impressed on the two partial beam paths 49A, 49B before they are fed to the intermediate imaging optical unit 43 with the aid of the deflection element 44A and the diochroic beam splitter 44B. As in the second concrete embodiment variant, the partial beam paths 49A, 49B are neither spatially nor temporally separated from one another, but rather separated by inherent properties of the light of the two partial beam paths. This makes it possible for both partial beam paths as in the second concrete embodiment variant, to be fed to the changeover device in a manner overlapping one another spatially and temporally. However, this is associated with a loss of brightness since only part of the total light present is fed to the changeover device. In contrast thereto, in the first concrete embodiment variant, in which there is a spatial separation of the partial beam paths during the first passage thereof through the intermediate imaging optical unit, each partial beam path transmits the maximum possible intensity, disregarding the slight losses that inevitably occur during passage through optical elements. However, the higher luminous efficiency in the first concrete embodiment variant is bought at the expense of the dimensions of the intermediate imaging optical unit being larger in comparison with the dimension of the intermediate imaging optical unit in the second and third concrete embodiment variants. The devices in accordance with the second and third embodiment variants are therefore demarcated from the prior art inventively even when they are used with a sensor having global shutter. In this case, at least a more compact linear arrangement of the optical element can be achieved in comparison with the prior art.

Figure 14:
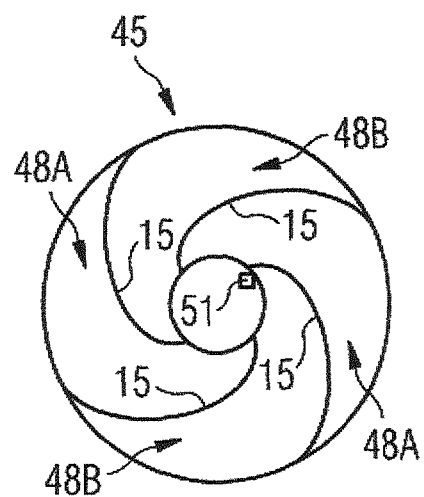
FIG. 14 shows the structuring of a spectral filter wheel which is used in the device shown in FIGS. 11 and 12.

The spectral filter wheel 45, which is employed as changeover device in the third embodiment variant, is illustrated in FIG. 14. It comprises at least two spectral filter regions 48A, 48B, the transmission characteristic of which respectively corresponds to one of the two spectral filters 42A, 42B and which are separated from one another by spiral separating lines 15. In the present exemplary embodiment, a total of four spectral filter regions are present, of which respectively two spectral filter regions situated opposite one another mirror-symmetrically with respect to the partial optical axis OA1 have the same filter characteristic.

Since the filter characteristics of the spectral filter regions on the spectral filter wheel 49 correspond to the filter characteristics of the spectral filters 42A, 42B, the fact of which excerpts of the partial beams of rays can reach the sensor 47 is dependent on the rotational position of the spectral filter wheel 45. The spectral filter wheel 45 rotates during the time-sequential recording of the three-dimensional images. On account of the rotation, the image of the separating line 15 moves over the sensor area, such that, with the aid of said image, pixel regions that are fed excerpts of different partial images with their different spectral characteristics are separated from one another. In this case, the separating line 15 between two filter regions 48A, 48B is fashioned such that in each case only one of these separating lines is imaged onto the sensor. This can be achieved by suitable dimensioning of the spectral filter wheel 45 and an adapted course of the spiral separating line 15. Given suitably chosen size relationships between the intermediate image formed in the spectral filter wheel 45 or in the vicinity thereof and the image that arises on the image sensor 47, what can be achieved is that the image 17 of the separating line 15 runs only over the pixel line that is currently to be read or the pixel lines that are currently to be read (if a plurality of pixel lines are read simultaneously). In this way it can be ensured that the exposure for the next partial image is not begun before the pixel line or the pixel lines has or have been read.

In the third concrete embodiment variant, the switching state of the changeover device is given by the relative phase angle of the spectral filter wheel 45. The synchronization of changeover device 45 and image sensor 47 is effected via the rotational speed of the spectral filter wheel 45 and a trigger signal. By way of example, if the intention is to record stereo images at 60 Hz, then the image sensor has to record individual images at 120 Hz. If, as illustrated in FIG. 14, a spectral filter wheel 45 is used in which each spectral filter region 48A, 48B having a specific transmission characteristic is present twice, the spectral filter wheel has to rotate at 60 Hz. As already explained, the relative phase of the spectral filter wheel represents the switching state of the changeover device.

The absolute phase between spectral filter wheel 45 and image sensor 47 is defined by means of the trigger signal. The latter can be initiated by a spectral filter wheel sensor, for example. In this case, a marking 51 is present on the spectral filter wheel, said marking being identified by a photodiode, for example. Said photodiode, upon identifying the marking 51, transmits the trigger signal to the image sensor, which thereupon begins the reading of the image. In this case, the trigger signal can be delayed in such a way that the mechanical transition between the filter regions of the spectral filter wheel 45 takes effect on the pixel lines, that is to say sweeps over a pixel line, only when the corresponding pixel line is read.

In the third concrete embodiment variant described in FIGS. 11 to 14 as well, the stops which cut out the partial pupils of the partial beams of rays can be virtual stops, wherein the position of the partial pupils is defined by means of the deflection element and the beam splitter and the size of the partial pupils is defined by the optical elements disposed downstream of the main objective, or real stops whose stop openings contain the spectral filters 42A, 42B.

In the third embodiment variant, the main objective 41 corresponds to the first optical assembly from FIG. 1, the intermediate imaging optical unit 43 together with the deflection element 44A and the beam splitter 44B corresponds to the second optical assembly, and the camera adapter optical unit 46 corresponds to the third optical assembly. In the case of virtual stops for producing the partial beam paths, the deflection element 44A and the beams guide 44B additionally constitute the partial beam generator.

In the third concrete embodiment variant, spectral filters 42A, 42B used can be color filters, for example. On account of the lower light losses associated with them, however, the use of interference filters is advantageous. The same correspondingly applies to spectral filter regions on the spectral filter wheel 45.

Two spectral filters and 2n spectral filter regions having mutually different transmission characteristics have been described with reference to FIGS. 11 to 14. However, there is also the possibility of providing more than two spectral filters and/or more than 2n spectral filter regions on the color filter wheel. With more than two spectral filters, three or more partial beam paths can be time-sequentially fed to the image sensor. Overall, the number of spectral filters then present is equal to the number of partial beams of rays that are intended to be generated, and the spectral filter wheel is equipped with the same number of spectral filter regions as the number of spectral filters present or an integer multiple thereof. The use of an integer multiple of the number of spectral filters makes it possible to reduce the rotational speed of the spectral filter wheel.

In a further modification of the third concrete embodiment variant, it is also possible, in principle to dispense with the spectral filters 42A and 42B if a diochroic beam splitter is used, which, by way of example, reflects a spectrum as illustrated by solid lines in FIG. 13 and a spectrum as illustrated by the dashed lines in FIG. 13 is transmitted. If the spectral filters 42A and 42B are additionally present in this embodiment variant, however, the spectral separation of the partial beams of rays can be improved further. Owing to the slightly different spectral characteristic in the different partial beams, it may be the case that the color rendering of the image sensor is different for the different partial beams; this occurs particularly when the number n of spectral filter regions is small. In this case, it is advantageous to carry out a white point adjustment of the sensor separately for all partial beams. In a downstream correction, the images of the partial beams can be adapted in such a way that the colors are identical again.

Three concrete embodiment variants of the device for the time-sequential recording of three-dimensional images have been described in order to explain the device according to the invention. The partial beam paths were separated from one another with regard to their angle of incidence on the changeover device in the first concrete embodiment variant, with regard to their polarization state in the second concrete embodiment variant, and with regard to their spectral properties in the third concrete embodiment variant. With all these embodiment variants, with a compact design of the device, a gain in efficiency is possible when using sensors or cameras having a rolling shutter. This becomes particularly great when the reading time of an image is close to the duration of a frame.

The present invention has been described with reference to exemplary embodiments and concrete embodiment variants with respect thereto. However, it is not intended to be restricted to the exemplary embodiments or to the concrete embodiment variants, but rather is intended merely to experience restriction by the claims. In particular, deviations from the embodiments or concrete embodiment variants are also possible within the scope of the claims. Thus, if the third optical assembly is embodied as a zoom system, it is possible to vary the optically used size of the changeover device in the intermediate image depending on the zoom position. In the exemplary embodiments described, this has the consequence that the number of pixel lines per changeover element line differs depending on the zoom position. However, for each zoom position it is possible to find an assignment which can be taken into account in the synchronization between the reading of the sensor and the switching of the switching states of the changeover device. For this purpose, the control unit can have a signal input, for example, via which it receives a signal representing the zoom position of the camera adapter optical unit. On the basis of said signal, the correct number of pixel lines of the sensor can then be assigned to a changeover element line by means of a stored look-up table, a stored formula or some other stored relation. Alternatively, there is also the possibility of inputting the zoom position of the camera adapter optical unit into the control unit manually. However, this requires a possibility for finding out the zoom position, for example by means of a scale which can be read and on which the zoom position is indicated.

The concrete embodiment variants 1 and 3 allow stereoscopic representations to be realized for more than one observer. In the first embodiment variant, this can be done by virtue of a changeover device being present near the intermediate image plane or in the intermediate image plane, said changeover device being configured as a tilting mirror matrix in which the tilting mirror elements are tiltable in arbitrary directions. Such a modification of the first concrete embodiment variant is described for example in DE 10 2011 010 262 to which reference is made with regard to further details in respect thereof. In such an arrangement, too, the assignment between the lines of the changeover device and the lines of the sensor is maintained. The gain in efficiency when using an inexpensive, compact camera having a rolling shutter then becomes particularly great. In the third concrete embodiment variant, more than two partial beam paths can be realized if a corresponding number of spectral filters are present. The latter would then be arranged e.g. symmetrically around the main optical axis. By means of a corresponding arrangement of deflection elements and beam splitters, the individual partial beams of rays can then be fed to the intermediate imaging optical unit. However, a restriction of the number of possible partial beams of rays results from the fact that, owing to the non-overlapping transmitted spectral ranges, the intensity of a single partial beam of rays decreases further and further as the number of partial beams increases.

What is claimed is:

1. A method for the time-sequential recording of three-dimensional images each comprising at least one first and one second partial image, with a single sensor (13, 27, 37, 47) having a number of pixels, wherein the pixels (16) are read time-sequentially and at least temporarily are subdivided into at least two mutually different pixel groups, wherein the mutually different pixel groups comprise a pixel group having pixels that have already been read and a pixel group having pixels that are predominantly still to be read, in which imaging the partial images of the three-dimensional image onto the sensor successively with the aid of successively assumed different switching states of a switchable changeover device (9, 25, 35, 45) comprises simultaneously imaging the first and the second partial image onto disjunct areas of the image sensor; and operating the changeover device (9, 25, 35, 45) during the time-sequential imaging of the partial images onto the sensor (13, 27, 37, 47) so that the changeover device (9, 25, 35, 45) assumes at least one switching state in which excerpts of different partial images are fed to the mutually different pixel groups of the sensor (13, 27, 37, 47).

2. The method of claim 1, further comprising feeding an excerpt of the previous partial image to the pixel group having pixels (16) that have predominantly not yet been read, and feeding an excerpt of the subsequent partial image to the pixel group having pixels (16) that have already been read.

3. The method of claim 1, in which the changeover device (9, 25, 35, 45) has a structuring with a separating line (15) between the structures, wherein determining the position of the image (17) of the separating line (15) on the sensor (13, 27, 37, 47) by the switching state of the changeover device (9, 25, 35, 45)

representing the subdivision of the pixels of the sensor (13, 27, 37, 47) into the pixel groups by the position of the image (17) of the separating line (15) on the sensor (13, 27, 37, 47).

4. The method of claim 3, moving the image (17) of the separating line (15) over the sensor (13, 27, 37, 47) by successively assumed switching states of the changeover device (9, 25, 35, 45).

5. The method of claim 4, synchronizing the reading of the pixels (16) with the movement of the image (17) of the separating line (15) over the sensor (13, 27, 37, 47) so that the image (17) of the separating line (15) is shifted after a predetermined proportion of the pixels (16) in the pixel group having the pixels that are predominantly still to be read has been read.

6. A device for the time-sequential recording of three-dimensional images each comprising at least one first and one second partial image, comprising a sensor (13, 27, 37, 47) having a number of pixels (16), that are subdivided at least temporarily are subdivided into two mutually different pixel groups, wherein the mutually different pixel groups comprise at least one pixel group having pixels that have already been read and a pixel group having pixels that are predominantly still to be read, an imaging optical unit having a switchable changeover device (9, 25, 35, 45), that images the partial images of the three-dimensional image time-sequentially onto the sensor (13, 27, 37, 47) with the aid of successively assumed different switching states of the changeover device (9, 25, 35, 45)1 and simultaneously images the first and the second partial image onto disjunct areas of the sensor, and a control unit (19) connected to the sensor (13, 27, 37, 47) and the changeover device (9, 25, 35, 45), said control unit (19) controlling the reading of the sensor (13, 27, 37, 47) and the switching states of the changeover device (9, 25, 35, 45) so that the changeover device (9, 25, 35, 45), during the imaging of the partial images onto the sensor (13, 27, 37, 47)1 assumes at least one switching state in which excerpts of different partial images are fed to the different pixel groups of the sensor (13, 27, 37, 47).

7. The device of claim 6, wherein the control unit (19) is configured so that, in the switching state of the changeover element (9, 25, 35, 45) in which excerpts of different partial images are fed to different pixel groups of the sensor (13, 27, 37, 47)1 an excerpt of the previous partial image is fed to the pixel group having the pixels that have predominantly not yet been read, and an excerpt of the subsequent partial image is fed to the pixel group having the pixels that have already been read.

8. The device of claim 6, wherein the changeover device (9, 25, 35, 45) has a structuring with a separating line (15) between the structures, wherein the separating line (15) separates structures from one another which feed excerpts of different partial images to the sensor (13, 27, 37, 47)

the switching state of the changeover device (9, 25, 35, 45) determines the position of the image of the separating line (15) on the sensor (13, 27, 37, 47), and the subdivision of the pixels of the sensor (13, 27, 37, 47) into the pixel groups is represented by the position of the image (17) of the separating line (15) on the sensor (13, 27, 37, 47).

9. The device of claim 8, wherein switching states of the changeover device (9, 25, 35, 45) are present for a plurality of positions of the image (17) of the separating line (15) on the sensor (13, 27, 37, 47), and the control unit (19) being configured to set the switching states successively so that the image (17) of the separating line (15) on the sensor (13, 27, 37, 47) is moved over the sensor (13, 27, 37, 47) at least partly by setting of the switching states.

10. The device of claim 9, wherein the control unit (19) instigates the reading of a predetermined proportion of the pixels in the pixel group having the pixels that are predominantly still to be read before the next switching state of the changeover element is assumed.

11. The device of claim 8, wherein the changeover device (9, 25, 35) comprises changeover elements (14), arranged to define a changeover element matrix having changeover element lines and/or columns and each of which can assume a number of different switching settings that is at least equal to the number of partial images that the three-dimensional image comprises, the changeover device (9, 25, 35) being structured into at least two mutually different changeover elements groups with mutually different switching settings of the changeover elements (14), wherein each changeover element group is formed from a variable number of changeover element lines and/or columns, an assignment of the changeover element lines and/or changeover element columns to the changeover element groups is effected by the separating line (15), and the position of the separating line (15) on the changeover device (9, 25, 35) is determined by the switching state of the changeover device (9, 25, 35), the pixels (16) of the sensor (13, 27, 37) are arranged in the form of pixel matrix having pixel lines and/or columns and each pixel group is formed from a variable number of pixel lines and/or columns, wherein the assignment of the pixel lines and/or pixel columns to the pixel groups is determined by the image (17) of the separating line (15) on the sensor (13, 27, 37), and each pixel group of the sensor (13, 27, 37) is assigned to exactly one changeover element group of the changeover element.

12. The device of claim 11, wherein the changeover elements (14) are mirror elements of a tilting mirror device or matrix elements of a liquid crystal display.

13. The device of claim 8, wherein the changeover device is a rotatably mounted spectral filter wheel (45) that is structured by at least two filter regions (48A, 48B) separated from one another by the separating line (15) and having different filter characteristics, wherein the control unit (19) controls the rotation of the spectral filter wheel (45).

14. The device of claim 13, wherein the separating line (15) runs spirally on the spectral filter wheel (45).

15. The device of claim 6, wherein the imaging optical unit comprises alongside the changeover device (9):

a first optical assembly (1) that converts a divergent light beam coming from an object plane substantially into a parallel light beam, a partial beam generator (5) disposed downstream of the first optical assembly (1) and generating from the parallel light beam at least two parallel partial light beams representing the partial images of the three-dimensional image, a second optical assembly (7) that images the parallel partial light beams onto an intermediate image plane coinciding with the changeover device (9) or situated in the vicinity thereof, such that intermediate images of the partial images of the three-dimensional image arise there, a third optical assembly (11) is disposed downstream of the changeover device (9) that images the intermediate partial images onto the sensor (13), wherein the control unit (19) controls the switching states of the changeover device (9) so that the intermediate partial images are imaged onto the sensor (13) time-sequentially by the third optical assembly (11).

\* \* \* \* \*